US012356472B2

(12) United States Patent
Kennedy et al.

(10) Patent No.: US 12,356,472 B2
(45) Date of Patent: *Jul. 8, 2025

(54) MICRO-NAVIGATION FOR A VEHICLE

(71) Applicant: Platform Science, Inc., San Diego, CA (US)

(72) Inventors: John C. Kennedy, San Diego, CA (US); Don Son, San Diego, CA (US); Scott Kopchinsky, San Diego, CA (US); Darrin Demchuk, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,769

(22) Filed: Apr. 7, 2024

(65) Prior Publication Data

US 2024/0260097 A1 Aug. 1, 2024

Related U.S. Application Data

(63) Continuation of application No. 18/201,689, filed on May 24, 2023, now Pat. No. 12,114,378, which is a (Continued)

(51) Int. Cl.
*H04W 76/10* (2018.01)
*H04L 67/12* (2022.01)
(Continued)

(52) U.S. Cl.
CPC ............ *H04W 76/10* (2018.02); *H04L 67/12* (2013.01); *H04W 4/40* (2018.02); *H04W 76/19* (2018.02); *H04W 84/005* (2013.01); *H04W 84/12* (2013.01)

(58) Field of Classification Search
CPC ....... H04W 76/10; H04W 4/40; H04W 76/19; H04W 84/005; H04W 84/12; H04W 4/024; H04W 4/44; H04W 12/50; H04L 67/12; H04L 67/14; H04L 67/52; H04L 67/04; H04L 67/535; G01C 21/3407
See application file for complete search history.

(56) References Cited

U.S. PATENT DOCUMENTS

| 10,341,442 B2* | 7/2019 | Sim ........................ H04W 4/027 |
| 2016/0334236 A1* | 11/2016 | Mason ............... G01C 21/3461 |
| 2019/0017839 A1* | 1/2019 | Eyler ................. G01C 21/3647 |

* cited by examiner

*Primary Examiner* — Kyaw Z Soe
(74) *Attorney, Agent, or Firm* — Clause Eight; Michael Catania

(57) ABSTRACT

A system and method for micro-navigation of a mobile object (1000) is disclosed herein. Micro-navigation provides guidance to destinations that are not normally found on maps or in navigation systems. In one micro-navigation method, data is collected (1501) related to route transit to specific end points that are not typically mapped. The end points are identified (1502) by relating specific geo coordinates, or physical landmark based characteristics, or electronically described and defined end point to a an identification that will be entered and stored in a location database. Guidance (1503) is provided to vehicles traveling to those end points or destinations, with additional information relevant to a route and/or a specific vehicle and configuration updated and made available to the system.

9 Claims, 21 Drawing Sheets

Related U.S. Application Data continuation of application No. 17/981,314, filed on Nov. 4, 2022, now Pat. No. 11,696,349, which is a continuation of application No. 17/022,027, filed on Sep. 15, 2020, now Pat. No. 11,503,655, which is a continuation-in-part of application No. 16/870,955, filed on May 9, 2020, now Pat. No. 11,330,644, and a continuation-in-part of application No. 16/664,906, filed on Oct. 27, 2019, now Pat. No. 10,803,682, said application No. 16/870,955 is a continuation-in-part of application No. 16/416,396, filed on May 20, 2019, now Pat. No. 10,652,935, which is a continuation-in-part of application No. 16/118,436, filed on Aug. 31, 2018, now Pat. No. 10,334,638, which is a continuation of application No. 15/917,633, filed on Mar. 11, 2018, now Pat. No. 10,070,471, said application No. 16/664,906 is a continuation of application No. 15/859,380, filed on Dec. 30, 2017, now Pat. No. 10,475,258, said application No. 15/917,633 is a continuation of application No. 15/624,814, filed on Jun. 16, 2017, now Pat. No. 9,961,710, said application No. 15/859,380 is a continuation-in-part of application No. 15/624,814, filed on Jun. 16, 2017, now Pat. No. 9,961,710.

(60) Provisional application No. 62/902,392, filed on Sep. 19, 2019, provisional application No. 62/441,298, filed on Dec. 31, 2016, provisional application No. 62/441,290, filed on Dec. 31, 2016, provisional application No. 62/352,014, filed on Jun. 19, 2016.

(51) Int. Cl.
*H04W 4/40* (2018.01)
*H04W 76/19* (2018.01)
*H04W 84/00* (2009.01)
*H04W 84/12* (2009.01)

MICRO-NAVIGATION FOR A VEHICLE

CROSS REFERENCES TO RELATED APPLICATIONS

The Present Application is a continuation application of U.S. patent application Ser. No. 18/201,689, filed on May 24, 2023, which is a continuation application of U.S. patent application Ser. No. 17/981,314, filed on Nov. 4, 2022, now U.S. Pat. No. 11,696,349, issued on Jul. 4, 2023, which is a continuation application of U.S. patent application Ser. No. 17/022,027, filed on Sep. 15, 2020, now U.S. Pat. No. 11,503,655, issued on Nov. 15, 2022, which claims priority to U.S. Provisional Patent Application No. 62/902,392, filed on Sep. 19, 2019, and U.S. patent application Ser. No. 17/022,027 is also a continuation-in-part application of U.S. patent application Ser. No. 16/870,955, filed on May 9, 2020, now U.S. Pat. No. 11,330,644, issued on May 10, 2022, which is a continuation-in-part application of U.S. patent application Ser. No. 16/416,396, filed on May 20, 2019, now U.S. Pat. No. 10,652,935, issued on May 12, 2020, which is a continuation-in-part application of U.S. patent application Ser. No. 16/118,436, filed on Aug. 31, 2018, now U.S. Pat. No. 10,334,638, issued on Jun. 25, 2019, which is a continuation application of U.S. patent application Ser. No. 15/917,633, filed on Mar. 11, 2018, now U.S. Pat. No. 10,070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, and the Present Application is a continuation-in-part application of U.S. patent application Ser. No. 16/664,906, filed on Oct. 27, 2019, now U.S. Pat. No. 10,803,682, issued on Oct. 13, 2020, which is a continuation application of U.S. patent application Ser. No. 15/859,380, filed on Dec. 30, 2017, now U.S. Pat. No. 10,475,258, issued on Nov. 12, 2019, which is a continuation-in-part application of U.S. patent application Ser. No. 15/624,814, filed Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 15/859,380 claims priority to U.S. Provisional Patent Application No. 62/441,290, filed on Dec. 31, 2016, U.S. Provisional Patent Application No. 62/441,298, filed on Dec. 31, 2016, and U.S. Provisional Patent Application No. 62/441,315, filed on Dec. 31, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to micro-navigation for a vehicle.

Description of the Related Art

Macro-navigation (traveling from an origination site to a destination site) for vehicles is well known. However, once a vehicle, such as a truck with cargo, arrives at a typically destination site like a warehouse campus, it must receive guidance to travel from an entrance to an ultimate terminal location such as a specific loading dock.

Also, unmapped routes present problems for truck drivers and other types of shippers.

Further, certain routes may not be appropriate for a truck of a particular size and load.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

FTP or File Transfer Protocol is a protocol for moving files over the Internet from one computer to another.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Processor generally includes all types of processors including without limitation microprocessors, general purpose processors, gate arrays, array processors, application specific integrated circuits (ASICs) and digital signal processors.

SCP (Secure Connection Packet) is used to provide authentication between multiple devices or a local party and remote host to allow for secure communication or the transfer of computer files.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

There is a need for informing a vehicle such as a truck, micro-navigation guidance at a destination site.

BRIEF SUMMARY OF THE INVENTION

The present invention provides a system and method for micro-navigation for a mobile object.

The present invention provides navigation to destinations that are not normally found on maps or in navigation systems.

The present invention ensures that routes provided to operators are suitable for the mobile objects they are operating—for example, a tractor trailer may not be able to drive around a building that has tight constraints in certain places, as easily as a VOLKSWAGON® bug. This system acknowledges those differences and provides different route choices for each.

Also, the present invention also collects the data automatically and associates it with mobile object configurations and stores them in databases under a unique Route Session name, where they are continuously compared to the route session over that same named route, that are taken by mobile objects of a similar configuration which is designated "mobile object cohorts" or "vehicle cohorts." By comparing route execution by mobile objects traveling the same route from the same cohort, the present invention continually refines the routes by optimizing for desired parameters, such as speed, number of maneuvers, changes in gear position, etc.

One aspect of the present invention is a method for micro-navigation of a mobile object. The method includes guiding a mobile object utilizing macro-navigation to travel from an origination site of an entrance of a destination site. The method also includes activating a micro-navigation guidance protocol upon arrival at the entrance of the destination site. The method also includes guiding the mobile object using the micro-navigation guidance protocol from the entrance to a terminal location within the destination site.

Another aspect of the present invention is a system for micro-navigation of a mobile object. The system comprises a database of mobile objects and ancillary equipment or attachments, a plurality of geometric maneuvering libraries for those same mobile objects and ancillary equipment identifying the known capabilities and constraints, an end point database, a plurality of routes, a route execution data capture to inclusive of route traced by the mobile object, total distance traveled, maneuvers executed, and contemporaneous speed during all route segments, a plurality of algorithms for translating route data into optimizable route structure tools to create routes that meet operator defined characteristics for complexity, duration, distance considering user selected mobile object and ancillary equipment intended for route passage, at least one user interface, and a mobile computing device with secure active connection to a mobile object data bus, where that data bus is capable of delivering signals triggered by mobile object movement, mobile object system activity, and operator generated mobile object responses, e.g., turning the steering wheel, braking, accelerating, or changes in transmission input and outputs.

Yet another aspect of the present invention is system for micro-navigation of a mobile object using device authentication and configurations. The system comprises a mobile object, a CVD, a mobile device, a server and a plurality of databases. The mobile object comprises an on-board computer with a memory having a vehicle identification number (VIN), a connector plug, and a motorized engine. The connected vehicle device (CVD) comprises a processor, a WiFi radio, a BLUETOOTH radio, a memory, and a connector for mating with the connector plug of the mobile object. The mobile device comprises a graphical user interface, a processor, a WiFi radio, a BLUETOOTH radio, and a cellular network interface.

Yet another aspect of the present invention a non-transitory computer-readable medium that stores a program that causes a processor to perform functions for instructing a mobile object for micro-navigation. The functions include utilizing macro-navigation to travel from an origination site of an entrance of a destination site. The functions also include activating a micro-navigation guidance protocol upon arrival at the entrance of the destination site. The functions also include guiding the mobile object using the micro-navigation guidance protocol from the entrance to a terminal location within the destination site.

Yet another aspect of the present invention is a system for micro-navigation of a vehicle. The system comprises a computing device configured to collect data related to route transit to specific end points that are not typically mapped, the computer device configured to identify those end points by relating specific geo coordinates, or physical landmark based characteristics, or electronically described and defined end point to an identification that will be entered and stored in a location database, the computer device configured to provide guidance to vehicles traveling to those end points or destinations, the computer device configured to continually refine, or, update same as additional information relevant to a route and/or a specific vehicle and configuration are made available to the system.

Yet another aspect of the present invention is a method for a micro-navigation of a vehicle. The method includes collecting data related to route transit to specific end points that are not typically mapped. The method also includes identifying those end points by relating specific geo coordinates, or physical landmark based characteristics, or electronically described and defined end point to an identification that will be entered and stored in a location database. The method also includes providing guidance to vehicles traveling to those end points or destinations. The method also includes continually refining or updating additional information relevant to a route and/or a specific vehicle and configuration are made available to the system.

Yet another aspect of the present invention a non-transitory computer-readable medium that stores a program that causes a processor to perform functions for instructing a vehicle for micro-navigation. The functions include colleting data related to route transit to specific end points that are not typically mapped. The functions also include identifying those end points by relating specific geo coordinates, or physical landmark based characteristics, or electronically described and defined end point to a an identification that will be entered and stored in a location database. The functions also include providing guidance to vehicles traveling to those end points or destinations. The functions also include continually refining or updating additional information relevant to a route and/or a specific vehicle and configuration are made available to the system.

Yet another aspect of the present invention is a method for a micro-navigation of a vehicle. The method includes determining, at a server, a mapped location of a macro/micro route interface associated with a known vehicle. The method also includes retrieving from the server at least one micro-navigation route to reach a desired unmapped end point. The method also includes selecting the at least one micro-navigation route based on one or more parameters for the known vehicle. The method also includes tracking the selected micro-navigation route for the known vehicle from the mapped location of a macro/micro route interface to the desired end point. The method also includes generating a micro-navigation session for the selected micro-navigation route based on the movement data and the performance data, and naming and storing the micro-navigation session in a database.

Yet another aspect of the present invention is a method for a micro-navigation of a mobile object. The method includes collecting data related to a route transit to a plurality of specific end points that are unmapped or a specific mobile object and configuration to a plurality of specific end points that are unmapped. The method also includes identifying at least one specific end point by relating at least one specific geo coordinate, magnetic field navigation, at least one physical landmark based characteristic, or an electronically described and defined end point to an identification that is entered and stored in a location database. The method also includes providing guidance to vehicles traveling to the at least one specific end point. The method also includes continually refining or updating additional information relevant to a route or a specific mobile object and configuration.

Yet another aspect of the present invention is a method for a micro-navigation of a vehicle. The method includes collecting, at a server, movement data for a known vehicle from a last mapped location associated with the known vehicle. The method also includes tracking a movement of the known vehicle until the known vehicle reaches a final stop position at an end point. The method also includes associating the movement of the known vehicle with performance data comprising at least one of vehicle performance data, operator input data or data collected by an external equipment. The method also includes generating a micro-navigation session for the executed route based on the movement data and the performance data, and naming and storing the micro-navigation session in a database.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
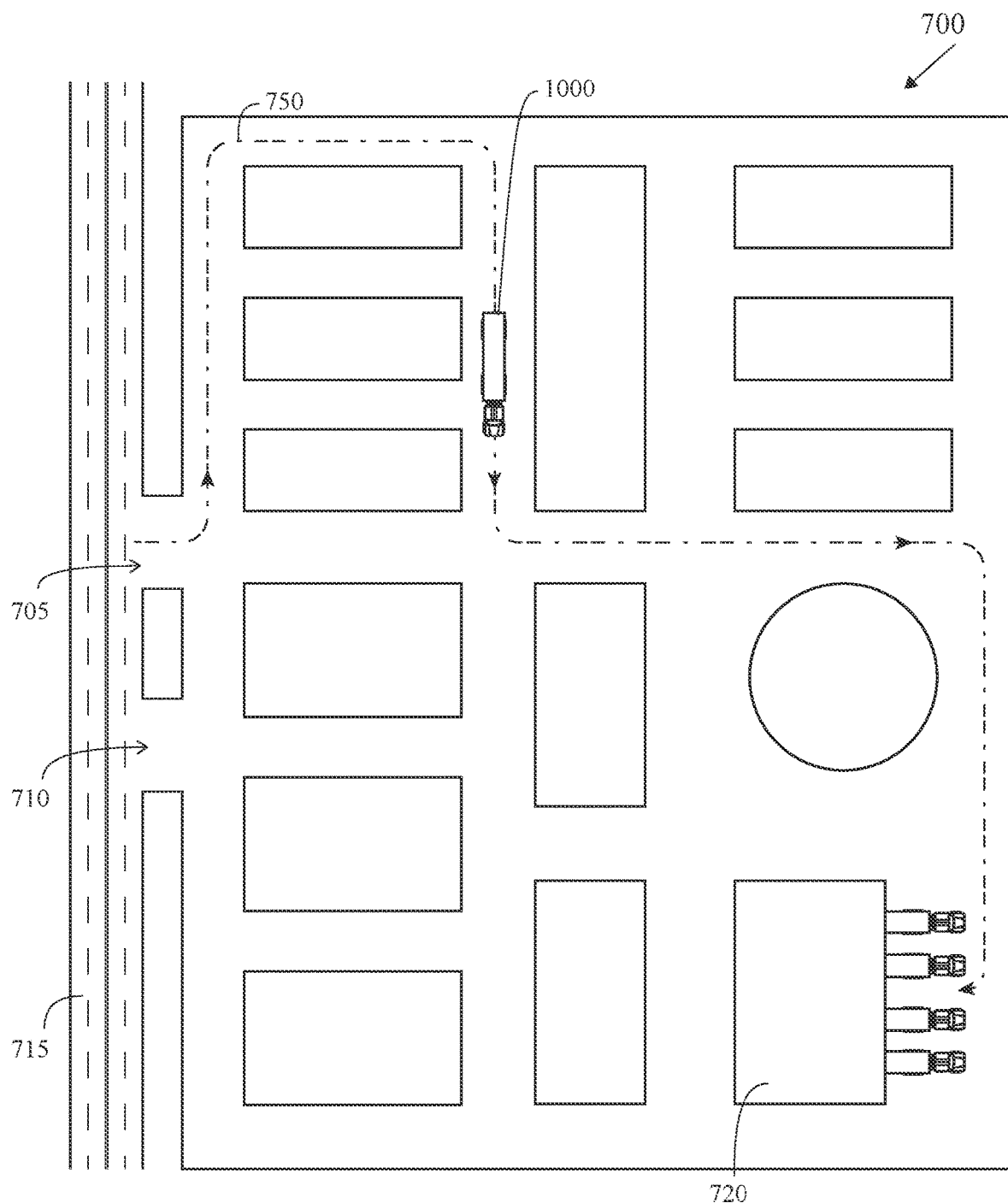
FIG. 1 is an illustration of a micro-navigation guidance map for a facility.

The present invention preferably enables precise navigation across a highly specific ground path to a final stopping point that may or may not be listed in publicly available libraries. These may include but are not limited to warehouse loading docks, gas station fuel collection decks, or non-permanent locations like oil wells.

The system creates micro-navigation routes by capturing data that is self-published by mobile objects such as vehicles that record and transmit their ground path and mobile object parameters generated during the time of the ground paths creation, from mobile objects that travel from a publicly published location like a street address, GPS coordinate, or other form of established man-made landmark with a known location, to a final stopping point that does not have a location that can be referenced by any of the above sources, or other commonly available source. Mobile objects preferably include but are not limited to vehicles, bicycles, maritime vessels, mobile robots, delivery drones, airplanes, and the like.

The system preferably associates these micro-navigation routes with "known mobile objects" where the known mobile object preferably comprises a self-contained vehicle, like a passenger automobile, a tractor trailer trailing a trailer of known length or any other type of combination of vehicle assets, where that combination represents the "configuration" that is anticipated to be present at the time a known mobile object executes a specific route, or, when it records data while traveling the specific route.

The present invention is preferably suitable for mobile objects, specifically vehicles, that have both fixed and changeable characteristics, such as the addition of trailers or antennas of varying lengths that would change the suitability of any individual route for a mobile object based on those changes.

In a planning phase, first, an operator inputs a destination (Street Address, GPS Position) which is a "known location." Next, the operator is queried: "final stop this leg?"→Yes/No. If Yes, no further action required, utilize normal nav. If No, Drop down menu appears: Route Selection: Operator Selects between an Unlisted Route and a Listed Route.

Selecting an "Unlisted Route" indicates that the operator is not aware of any existing route connecting the known location and the Final Stop. Selecting the "Unlisted Route" triggers the system to begin capturing data between the time the Known Location is reached, and the Final Stop is triggered. When the Final Stop is triggered, an Assigning Authority preferably designates a name for the Unlisted Location, or can delegate that authority. When the Final Stop is triggered, a Route Table is populated with data related to the mobile object movements and the mobile object performance between the Known Location and the Final Stop.

"Listed Routes" are routes that have previously been associated with the "Known Location." If the operator selects/clicks "Listed Route," options appear in sequence: First, operator selects a Route from a list of "Listed Routes: Second, the operator selects a more specific route based on additional criteria: Most Popular; Fastest; Safest; Least Maneuvers; No Left Turns; Etc. The operator then selects the desired "Listed Route." The operator selected Listed Route is pulled from a route table.

The operator drives to a "Known Location," Street Address, GPS Position, Other, from Step 1. The operator arrives at the Known Location. The navigation alerts the operator that it is switching to MicroNav. The MicroNav validates the mobile object is at the precise Known Location to initiate the MicroNav. If not at the precise Known Location, the MicroNav calculates a course correction. The navigation is applied to safely put the mobile object on the MicroNav Route. The MicroNav commences: Route is tracked; mobile object Events are tracked; and Operator Inputs are tracked. The Final Stop is reached and confirmed. Data populates the Route Table as a "New Record." The New Record is scored against a population of cohort records. The Route Table is then updated as necessary.

A first embodiment is method for micro-navigation of a vehicle. The method includes guiding a mobile object utilizing macro-navigation to travel from an origination site of an entrance to a destination site (end point). The method also includes activating a micro-navigation guidance protocol upon arrival at the entrance of the destination site. The method also includes guiding the mobile object using the micro-navigation guidance protocol from the entrance to a terminal location within the destination site.

A second embodiment is a system for micro-navigation of a mobile object. The system comprises a computing device configured to collect data related to route transit to specific end points that are not typically mapped. The computer device is preferably configured to identify those end points by relating specific geo coordinates, or physical landmark based characteristics, or an electronically described and defined end point to an identification that is entered and stored in a location database. The computer device is preferably configured to provide guidance to mobile objects traveling to those end points or destinations. The computer device is preferably configured to continually refine or update as additional information relevant to a route and/or a specific mobile object and configuration are made available to the system.

A third embodiment is non-transitory computer-readable medium that stores a program that causes a processor to perform functions for instructing a mobile object for micro-navigation. The functions include colleting data related to route transit to specific end points that are not typically mapped. The functions also include identifying those end points by relating specific geo coordinates, or physical landmark based characteristics, or an electronically described and defined end point to an identification that is entered and stored in a location database. The functions also include providing guidance to mobile objects traveling to those end points or destinations. The functions also include continually refining or updating as additional information relevant to a route and/or a specific mobile object and configuration are made available to the system.

In another embodiment, a known vehicle, connected to an assigning authority via a mobile wireless computing device attached to the vehicle and capable of receiving data, retrieving data from the vehicles data bus and related components, and transmitting data to authorized parties. The known vehicle is described during a period of time with a known start and starting time by a vehicle configuration with known characteristics, including those related to trailed vehicles and attached accessory components, other appendages, and their related known characteristics, which are known to be associated with the known vehicle during the period of data collection and retrieval, or, the period of the intended Micro-navigation route session, and together are collectively the "Known Vehicle." The Known Vehicle is preferably operated or controlled by an "Assigning Authority" preferably capable of: directing the activities and movements related to the operation of that vehicle; monitoring vehicle performance parameters, operator inputs to the vehicle, related navigation system, ground track and position, together the "Known Vehicle Micro-navigation raw data", via wireless or wired connections; causing the delivery of specific routing information to be delivered to the vehicles navigation system; causing the transmission of the Known Vehicle Micro-navigation Raw Data via wireless or wired means to a server that collects Micro-navigation Raw data; and disseminating Micro-navigation routes as instructed by the assigning authority to the Known vehicle.

In another embodiment, the system captures movement from the last "mapped" location that is associated with the Known Vehicle and a generally available public address, GPS coordinate, or location identification device associated with a known physical place, such as an RF beacon, QR code or other near range device that would validate the position of the known vehicle at a point in time. Movements of the Known Vehicle over the ground are tracked and associated with vehicle performance data and driver input data such as gear position, steering inputs, braking, acceleration, etc., until the vehicle reaches a "Final Stop" position, as indicated by a manual input by the driver, ignition off event, or other confirmation delivered by an off board assigning authority or authorized agent thereof. Each driven route is known as a Micro-navigation session, and once assigned a name by a naming authority, is entered into a database where that route is stored by that name, and retrievable by future authorized Known Vehicles, and by future Route Optimization sessions where the Micro-navigation data associated with that route is compared to future Micro-navigation sessions of that same route, and compared on the basis of configurable characteristics designed to allow operator or assigning authority optimization of certain desired operator outcomes of session performance such as route speed, number or maneuvers, direction of maneuvers, and critical event detection such as hard braking or impact, where that comparison will result in mathematically selected optimizations to achieve desired results and improve those results from time to time by comparison to ongoing route sessions conducted on that same route.

In another embodiment, from a "mapped" location that can be associated with the Known Vehicle and a generally available public address, GPS coordinate, or location identification device associated with a known physical place, such as an RF beacon, QR code or other near range device that would validate the position of the known vehicle at a point in time, the system provides operator access via a mobile connection to a cloud based server to routes suitable for that vehicle to reach an un-mapped objective point, that is described by name in the Micro-navigation Server's route database. An operator selected route or routes may offer the user choice of route based on the parameters that the operator would like to minimize or maximize, such as speed, number of maneuvers, turns required, etc., if there are more than one Micro-navigation session associated with the named route. Upon user initiation of a named route, movements of the Known Vehicle over the ground are tracked by one or more means comprised of GPS, inertial navigation, and accelerometer devices used to support dead reckoning by calculating changes in position and speed and suitable for calculating derived routes through the assembly of data points at proscribed intervals from the commencement of the Micro-navigation route session until the "Final" stop signal ends that Micro-navigation session. For the period of each operator Micro-navigation session, associated data is collected capturing vehicle performance data and driver input data such as gear position, steering inputs, braking, acceleration, etc., until the vehicle reaches a "Final Stop" position, as indicated by a manual input by the driver, ignition off event, or other confirmation delivered by an off board assigning authority or authorized agent thereof. Each driven route is known as a Micro-navigation session, is associated with the name of the selected route, and assigned a sequential version number, and its Micro-navigation raw data is transmitted and stored on the Micro-navigation server, where it is entered into a database where that route is stored by that name, and retrievable by future authorized Known Vehicles, and by future Route Optimization sessions where the Micro-navigation data associated with that route is compared to future Micro-navigation sessions of that same route, and compared on the basis of configurable characteristics designed to allow operator or assigning authority optimization of certain desired operator outcomes of session performance such as route speed, number or maneuvers, direction of maneuvers, and critical event detection such as hard braking or impact, where that comparison will result in mathematically selected optimizations to achieve desired results and improve those results from time to time by comparison to ongoing route sessions conducted on that same route.

The present invention preferably uses algorithms to optimize known routes.

The real-time data for the vehicle preferably comprises a real-time speed of the vehicle, tire pressure values from a plurality of tire sensors, refrigeration/HVAC unit values, a plurality of fluid levels, a plurality of power unit values, a real-time fuel tank capacity, and a fuel type.

The real-time driver profile preferably comprises amount of time driving during a pre-determined time period, number of rest breaks during the pre-determined time period, license compliance data, physical disabilities and driving violations.

The configuration of the vehicle is preferably selected from one of a single trailer, a dual trailer, a triple trailer, and a refrigeration trailer.

The dynamic compliance rules preferably comprise speed limits, transport of toxic waste, the transport of refrigerated cargo, the rest durations for drivers, the necessary insurance coverage, and the type of taxes and fees to be paid.

The workflow preferably comprises an origination location of the vehicle, a destination of the vehicle, a route to the destination, a cargo, a time of departure and a time of arrival.

The cloud sources preferably comprise a public cloud source, a private cloud source, a hybrid cloud source, a multi-cloud source, a service provider cloud, a telematics service provider cloud, an original equipment manufacturer cloud (truck manufacturer, Tier 1 supplier, device supplier and the like), a customer cloud (end user) and/or a public cloud.

FIG. 1 is an illustration of a micro-navigation guidance map for a facility 700. The facility has an entrance 705 from and exit 710 to a street 715. Macro-navigation would guide a vehicle 1000 to the street entrance 705 of the facility 1000. Within the facility 700, a vehicle must unload at a loading bay area 720. The vehicle is guided utilizing micro-navigation guidance to follow a path 750 from the entrance 705 to the loading bay area 720 and then to return to the street 715 from the loading bay area 720 by following the path 750.

Figure 2:
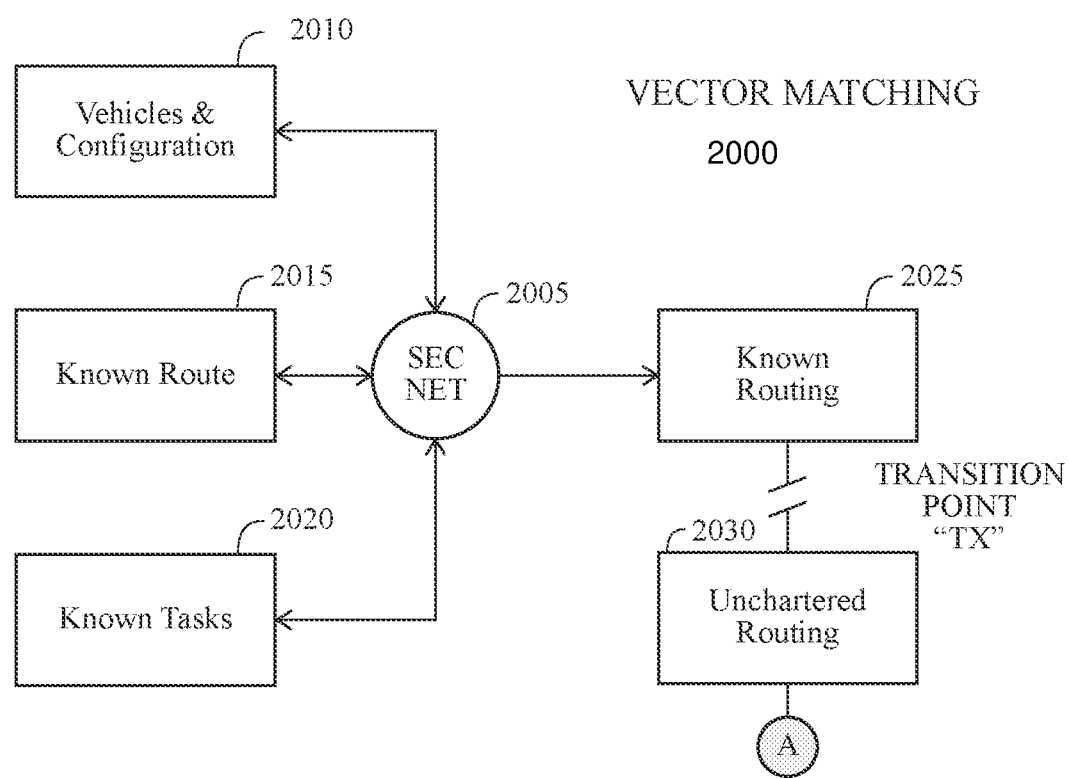
FIG. 2 is a block diagram of a vector matching process for a micro-navigation system.

FIG. 2 is a block diagram of a vector matching process 2000 for a micro-navigation system. At block 2010, vehicle configuration information is communicated with a secure network 2005. At block 2015, Known Route information is communicated, preferably using a server, with the secure network 2005. This information is preferably retrieved from a database by the server. At block 2020, Known Tasks, preferably from a database, are communicated with the secure network 2005. The data from the vehicle configuration block 2010, the Known Route block 2015 and the Known Tasks block 2020, are provided, preferably using a server, to a Known Routing block 2025 and then to an uncharted routing block 2030.

Figure 2A:
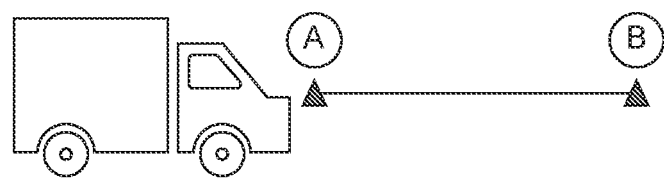
FIG. 2A is an illustration for steps of the vector matching process for a micro-navigation system.
Figure 2B:
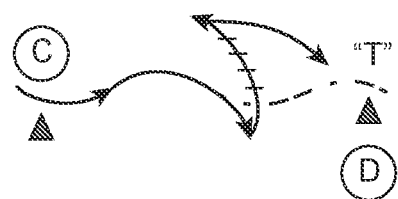
FIG. 2B is an illustration for steps of the vector matching process for a micro-navigation system.

As shown in FIG. 2A, at step A, the micro-navigation system (preferably a server with databases in communication with a CVD within the vehicle) tracks all of the movement from a transition point, TX, to a mark position trigger. At step B, a vector captures duration for speed and a line is drawn for distance. As shown a Known Vehicle is on a Known Path/Route. As shown in FIG. 2B, the Known Vehicle begins transit on an unknown path. At step C a vehicle is assigned a target to create an endpoint. At step D, the micro-navigation system calculates a best-fit linear path for the vehicle. Then the micro-navigation system compares the best-fit linear path to known paths for a similar configuration. Then the micro-navigation system iterates the smoothest path or shortest path for the vehicle. In one example, the route is entered in the database as Route 1 of "A" Routes.

Figure 2C:
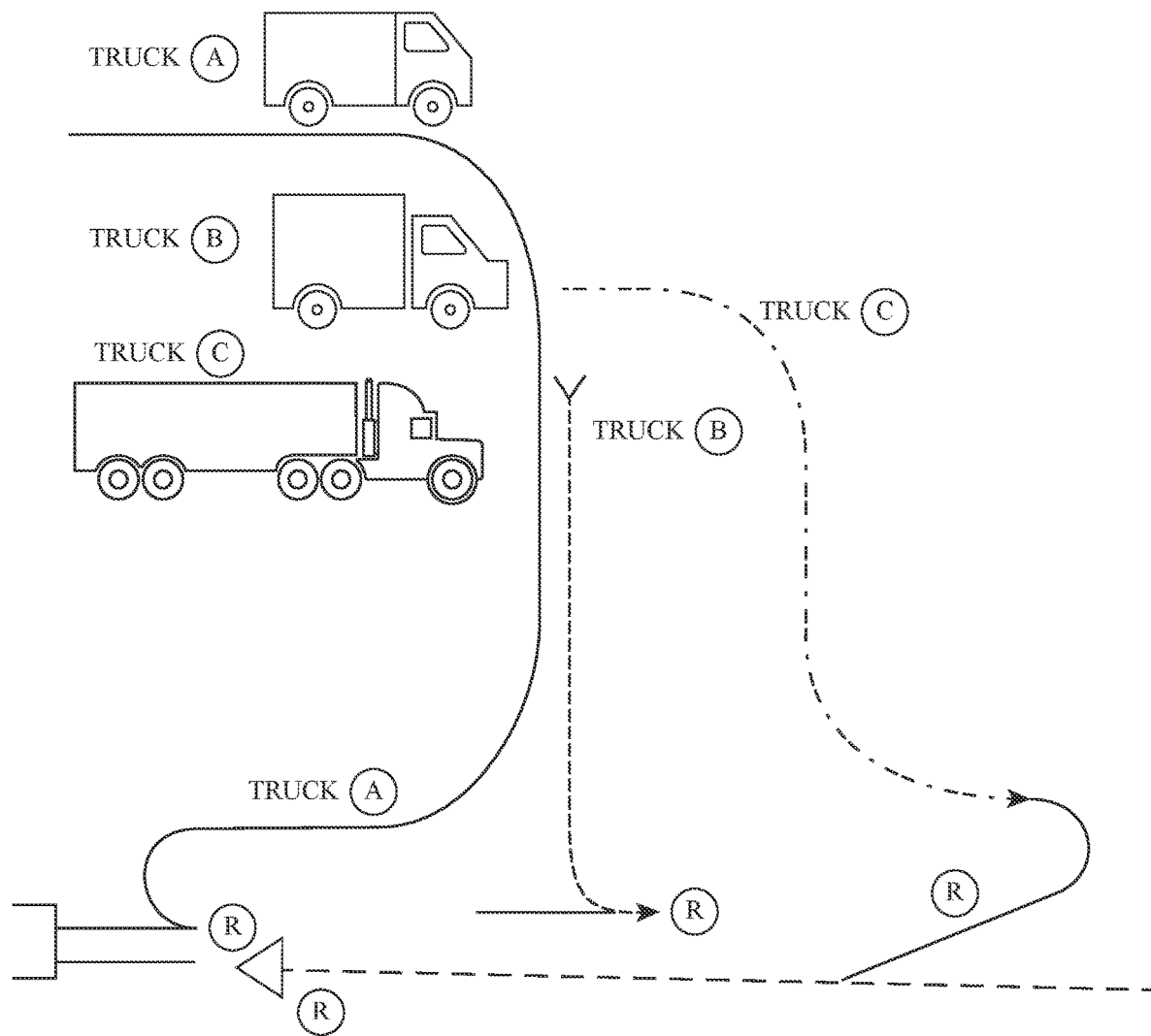
FIG. 2C is an illustration for steps of the vector matching process for a micro-navigation system.

FIG. 2C illustrates providing different micro-navigation routes to a similar end point for vehicles that differ in configuration or size. A vehicle A is provided a first route to end point R. A vehicle B, of a different size from vehicle A, is provided a different route to an end point R. A vehicle C, of a different configuration than vehicles A and B, is a provided a different route to an end point R.

The system also preferably includes physical infrastructures with communication devices comprising at least one of a building, a gate, an access controlled point of entry, a parking structure, a weigh station, a toll collection structure, a fueling equipment and a vehicle service equipment. In one embodiment, a passive device on a physical structure broadcasts a unique ID which is received by a mobile device and a vehicle gateway device. If the passive device is a BLUETOOTH device, it broadcasts a BLUETOOTH advertisement.

Multiple vehicle connected mobility devices are preferably used with the system 1600 and comprise at least one of a tablet computer, a mobile phone, a scanning device, a beacon, a RF passive or active communication device and a signature capture device.

The vehicle 1000 is preferably one of a long-haul semi-truck, a bus, a sedan, a pick-up, a sports utility vehicle, a limousine, a sports car, a delivery truck, a van, or a mini-van.

Figure 3:
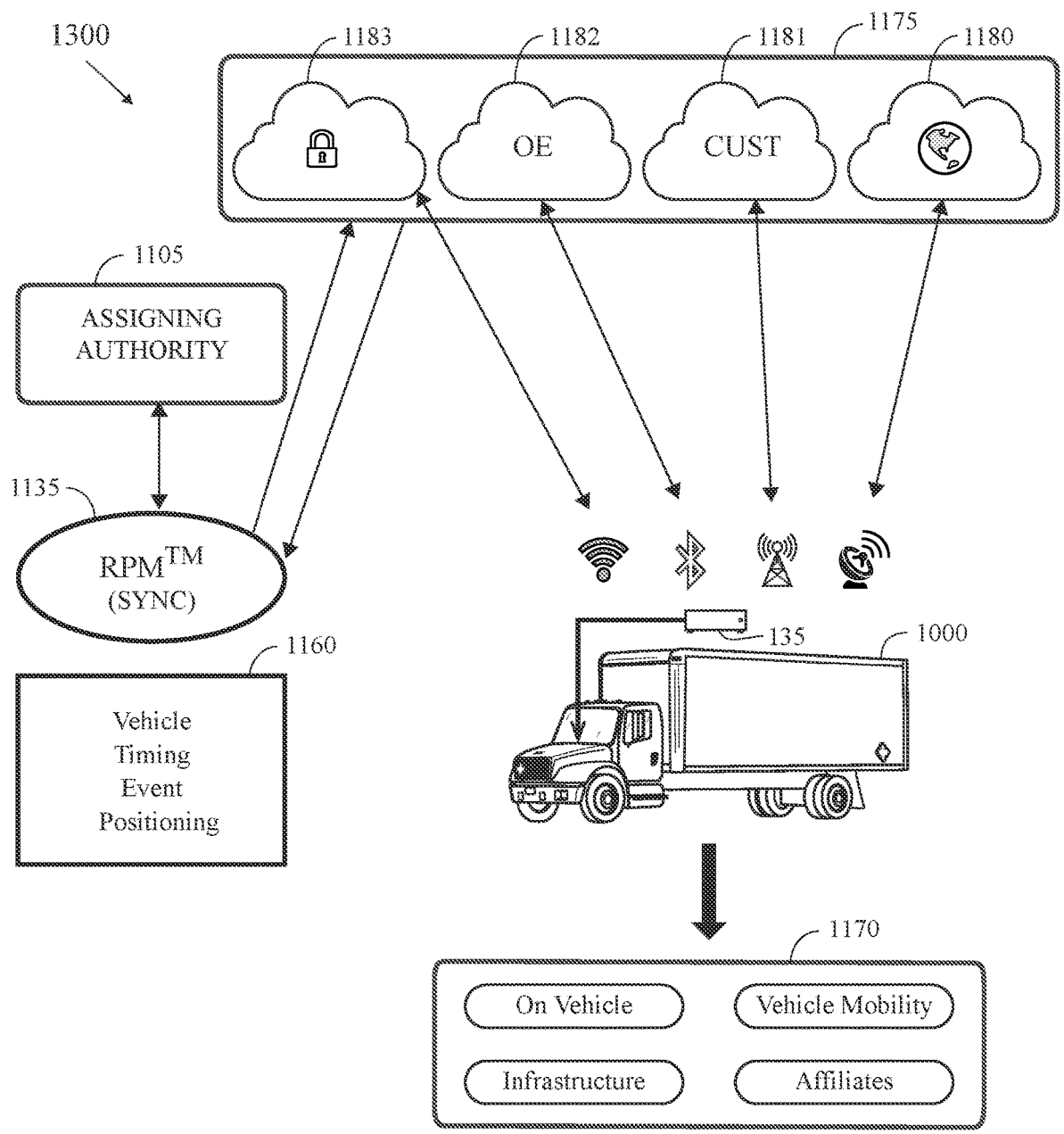
FIG. 3 is a block diagram of a system for remote profile management for utilizing data and computational information from on-vehicle and off-vehicle sources.

As shown in FIG. 3, the vehicle 1000 has multiple connection points with direct connectivity to a CVD 135, and requires no routing through a cloud service. The endpoints are user interfaces or built in displays, devices connected through fixed or wireless connection to the vehicle's CVD 135, sensors connected through a vehicle bus (see FIG. 4A) to the CVD 135, or directly to the CVD 135 via wired or wireless connection, like devices. The vehicle 1000 is preferably a primary generator and source of VTEP data 1160.

The RPM 1130 preferably comprises a RPM sync 1135 for syncing with other devices, servers, the Cloud, the CVD and the like.

The real-time data for the vehicle 1000 preferably comprises a real-time speed of the vehicle, tire pressure values from a plurality of tire sensors, refrigeration/HVAC unit values, a plurality of fluid levels, a plurality of power unit values, a real-time fuel tank capacity, and a fuel type.

The plurality of configurable real-time vehicle data trigger events comprises a value outside of a predetermined range for the real-time data of the vehicle.

The real-time driver/operator profile comprises amount of time driving during a pre-determined time period, number of rest breaks during the pre-determined time period, license compliance data, physical disabilities and driving violations.

One example of an off-vehicle source is a fuel stop. A profile of a fuel stop preferably comprises real-time types of fuels available, set billing instructions, physical dimensions of a plurality of fuel pumps, GPS coordinates, hours of operation, food service availability, and resting area availability. The predetermined fueling time period is a time range to fuel the vehicle based on the real-time GPS location of the vehicle, the real-time speed of the vehicle, the distance to the selected fuel stop from the real-time GPS location of the vehicle, and the hours of operation of the fuel stop.

A configuration of the vehicle 1000 is preferably selected from one of a single trailer, a dual trailer, a triple trailer, and a refrigeration trailer.

Another example of an off-vehicle source is a database (Federal, State local) with dynamic compliance rules. The dynamic compliance rules comprise speed limits, transport of toxic waste, the transport of refrigerated cargo, the rest durations for drivers/operators, the necessary insurance coverage, and the type of taxes and fees to be paid.

The workflow utilized by the assigning authority engine 1105 preferably comprises an origination location of the vehicle, a destination of the vehicle, a micro-navigation route to the destination, a cargo, a time of departure and a time of arrival.

Figure 4:
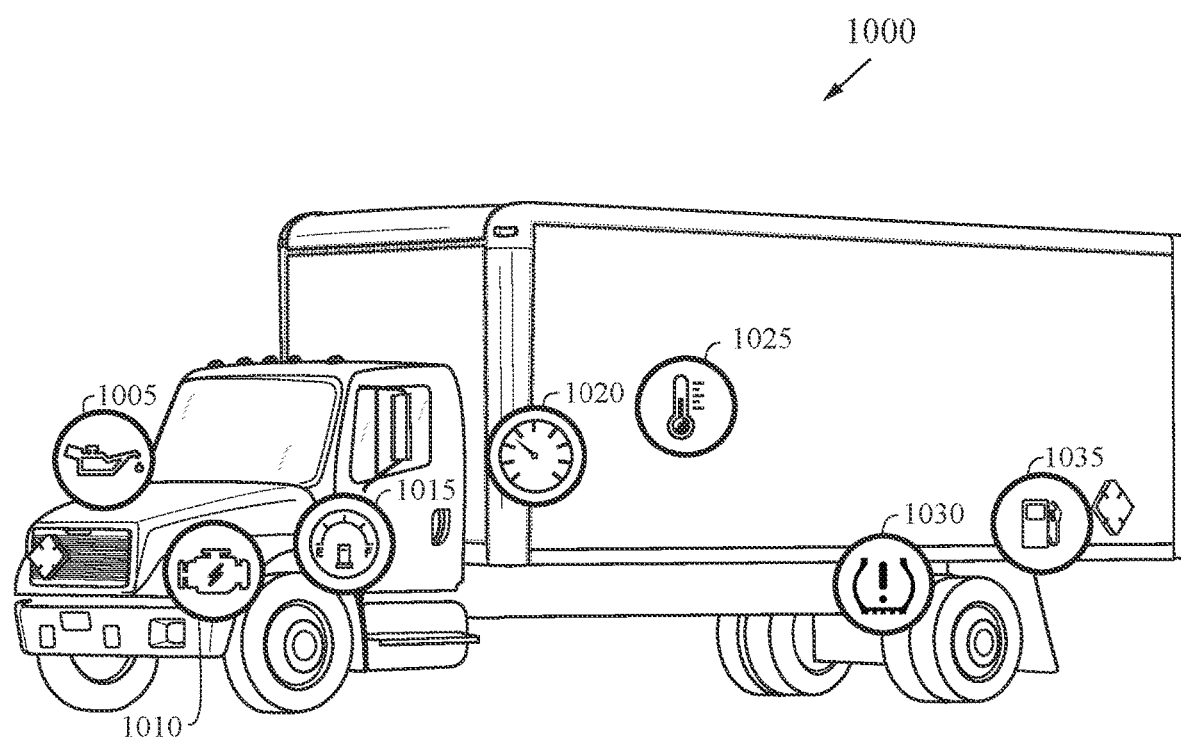
FIG. 4 is an illustration of multiple sensors on a truck.
Figure 4A:
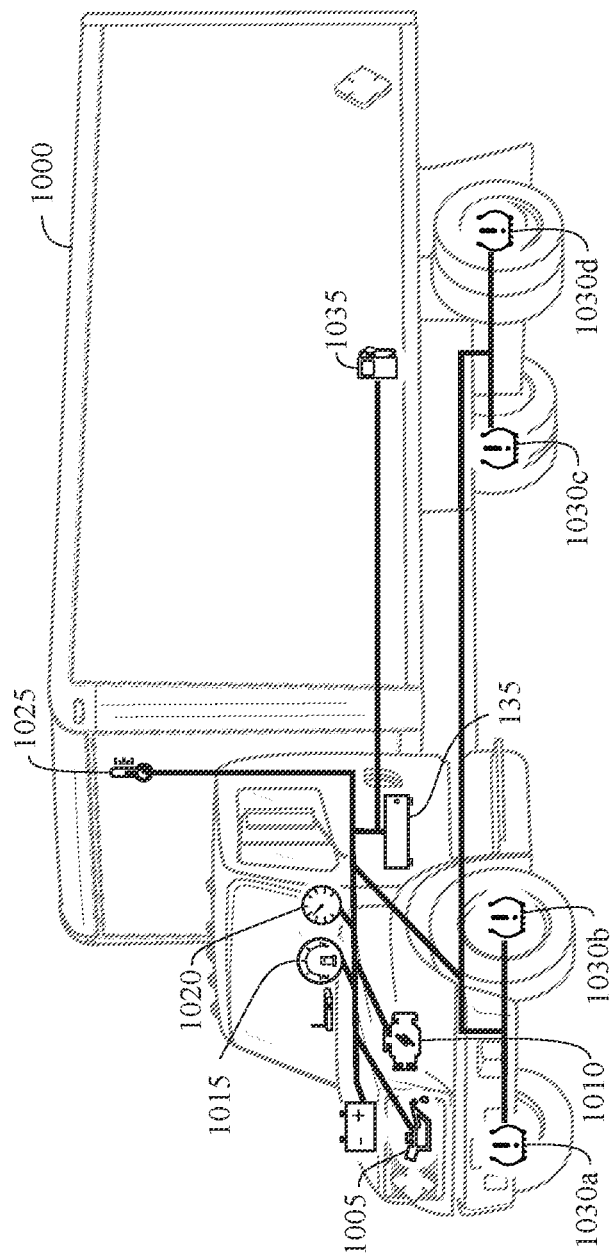
FIG. 4A is an illustration of multiple sensors on a truck connected to a BUS for the truck.

FIG. 4 is an illustration of multiple sensors on a truck 1000. The vehicle/truck 1000 preferably comprises an oil level sensor 1005, an engine sensor 1010, a power sensor 1015, a refrigeration/HVAC sensor 1020, a temperature sensor 1025, a tire pressure sensor 1030, and a fuel sensor 1035. Those skilled in the pertinent art will recognize that multiple other sensors may be utilized without departing from the scope and spirit of the present invention. FIG. 4A is an illustration of multiple sensors on a truck connected to a data bus for the truck. Each of the sensors (oil level sensor 1005, engine sensor 1010, a power sensor 1015, a refrigeration/HVAC sensor 1020, a temperature sensor 1025, tire pressure sensors 1030a-d, and fuel sensor 1035) is preferably connected to the data bus for transferring data to an on-board computer of the vehicle 1000, or directly to the CVD 135. Alternatively, some or all of the sensors use wireless communications to communication with the CVD 135.

Figure 5:
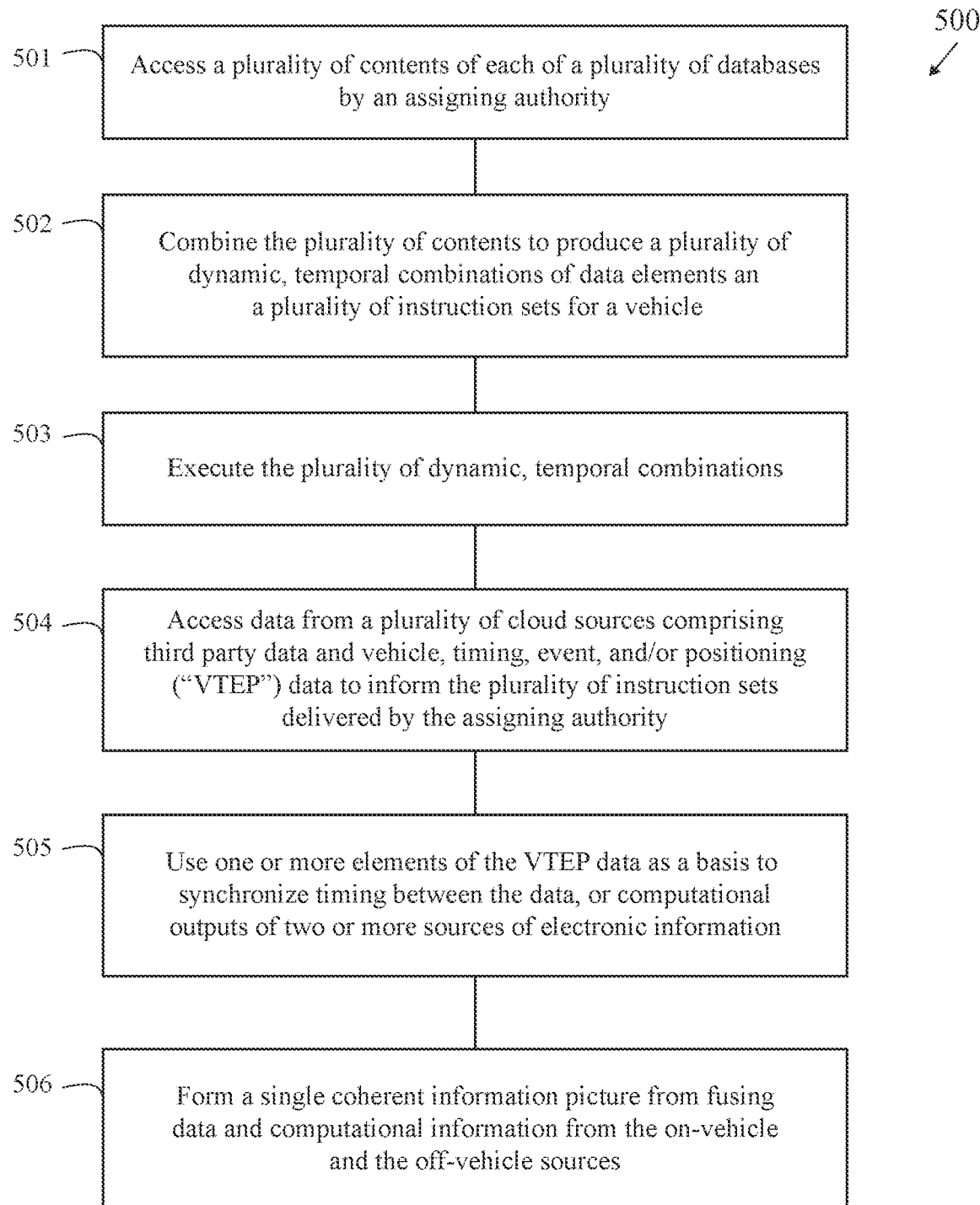
FIG. 5 is a flow chart for a method for remote profile management for utilizing data and computational information from on-vehicle and off-vehicle sources.

FIG. 5 is a flow chart for a method 500 for remote profile management for utilizing data and computational information from on-vehicle and off-vehicle sources for micro-navigation. At block 501, the contents of each of a plurality of databases are accessed by an assigning authority engine. At block 502, the contents are combined to produce a plurality of dynamic, temporal combinations of data elements and a plurality of instruction sets for a vehicle. At block 503, the plurality of dynamic, temporal combinations is executed. At block 504, data from a plurality of cloud sources comprising third party data and vehicle, timing, event, and/or positioning ("VTEP") data is accessed to inform the plurality of instruction sets delivered by the assigning authority engine to the RPM. At block 505, one or more elements of the VTEP data is used as a basis to synchronize timing between the data, or computational outputs of two or more sources of electronic information. At block 506, a single coherent information picture is formed from fusing data and computational information from the on-vehicle and the off-vehicle sources.

Figure 6:
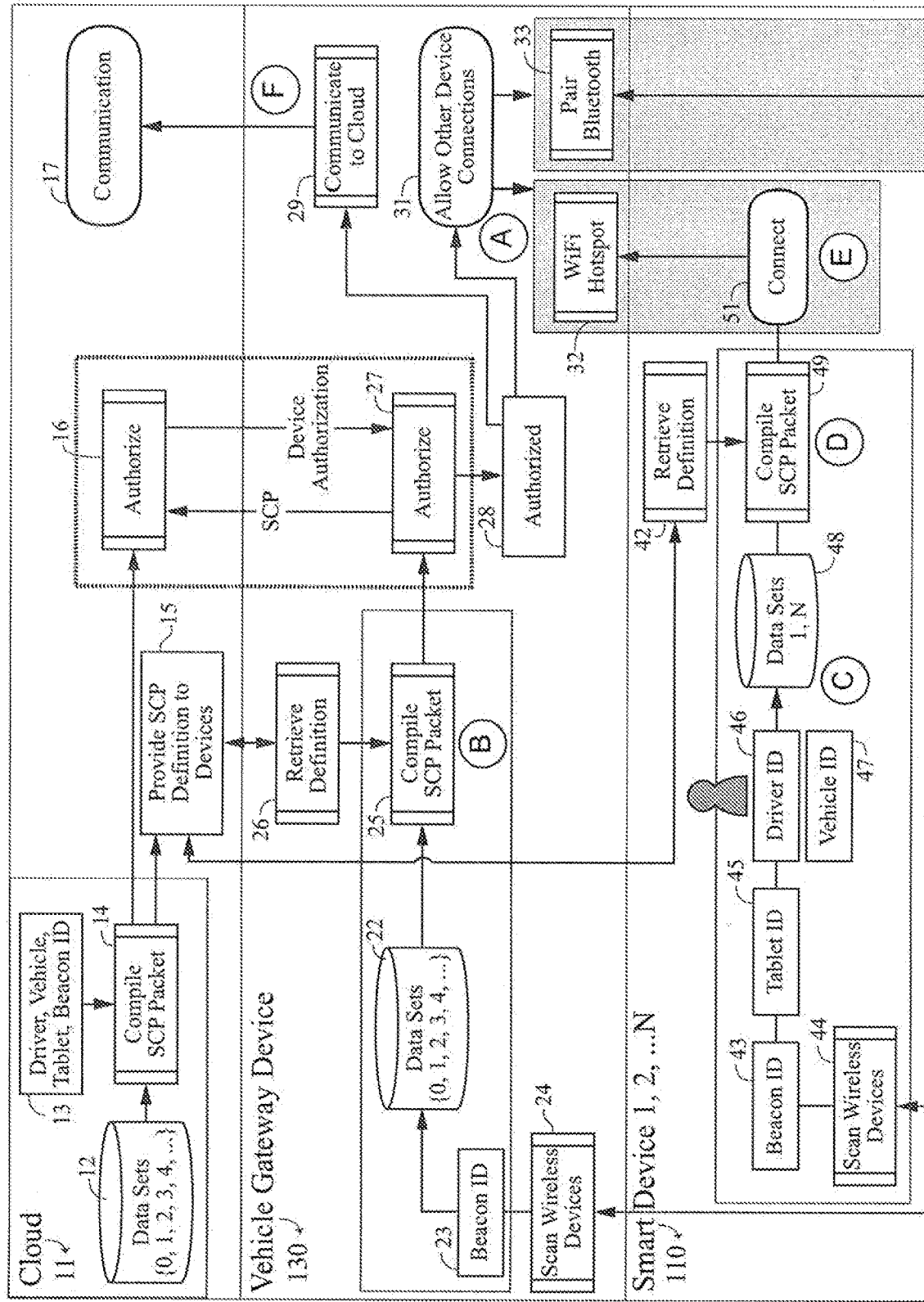
FIG. 6 is a block diagram of system for a secure communication protocol for connecting a wireless device to a single access point in a vehicle.
Figure 6A:
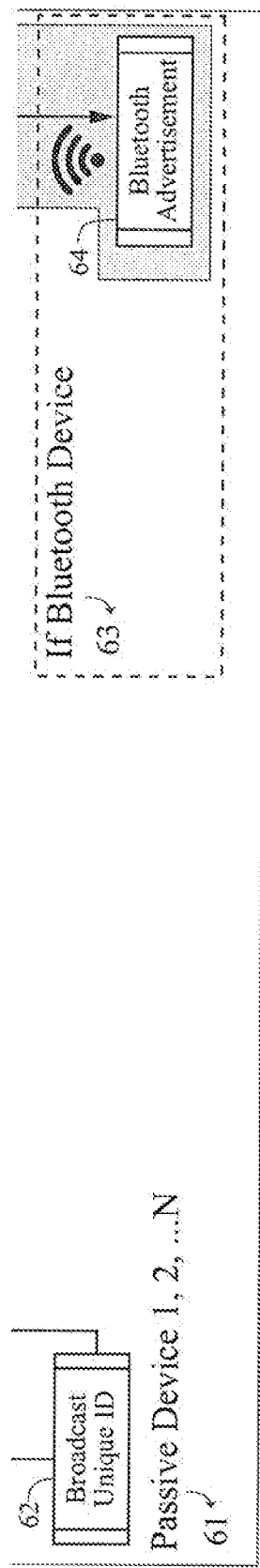
FIG. 6A is a continuation of the block diagram of FIG. 6.

A system 10 for securely connecting a wireless device to a single access point in a vehicle for a predetermined work assignment (that preferably includes a micro-navigation route) is shown in FIGS. 6 and 6A. The system 10 preferably comprises a remote server (cloud) 11, a vehicle gateway device 130, a smart device 110 and a passive device 61. The vehicle gateway device 130 is preferably a connected vehicle device ("CVD").

The server/cloud 11 accesses dataset 12 and obtains driver information. Vehicle information, mobile device information (MAC address), passive device information (beacon ID) and other information to compile a SCP packet 14. At block 15, the server 11 provides SCP definitions to the vehicle gateway device 130 and the mobile device 110. At block 16 the server/cloud 11 authorizes the SCP. At block 17, the server/cloud 11 communicates with the vehicle gateway device 130.

The vehicle gateway device 130 uses datasets 22, with the beacon ID 23, a scan of wireless devices 24 along with the SCP definitions 26 received from the server/cloud 11 to compile a CVD compiled SCP packet 25. The CVD compiled SCP packet is sent to the cloud/server 11 at block 16 and authorization/validation of the CVD compiled SCP packet is received at block 27. At block 28 the SCP is authorized for broadcasting at the vehicle gateway device 130 a wireless network with a hidden and hashed SSID unique to the vehicle, the hidden and hashed SSID generated from the validated SCP packet. At block 29, the vehicle gateway device 130 communicates the broadcast with the server/cloud 11. At block 31, the vehicle gateway device 130 communicates with other devices, namely the smart device 110 over preferably a WiFi hotspot 32 and the passive device 61 by pairing using a BLUETOOTH communication protocol at block 33.

At block 49, the smart device (mobile device) 110 compiles a complied mobile device SCP packet from the SCP definitions 42, the data sets 48, the beacon ID 43, the Tablet ID 45, a driver ID 46, a vehicle ID 47 and scan of wireless devices 44. The mobile device 110 generates the hashed SSID and a passphrase from the complied mobile device SCP packet. At block 51, the mobile device 110 connects to the WiFi hotspot 32 of the vehicle device gateway 130.

The passive device 61 broadcast a unique ID at block 62 which is received by the mobile device 110 and the vehicle gateway device 130. At block 63, if a BLUETOOTH device, it broadcasts a BLUETOOTH advertisement at block 64.

The SCP is defined by an assigning authority in the server/cloud 11. The server/cloud 11 sends the SCP definition and any other required data in datasets to the CVD 130 and the mobile device 110. The CVD 130 adds the contextual data from local datasets to the sever-sent data to compile its SCP based definition. The local datasets include data wirelessly scanned from passive devices, preferably transmitting a BLUETOOTH beacon. Other local datasets include information from the vehicle. The CVD 130 sends its compiled SCP packet to the server 11 for authorization. The server 11 verifies the CVD compiled SCP packet, and if valid, the server 11 transmits a validation/approval signal to the CVD 130. The CVD then generates an access point SSID/passphrase with SCP. Likewise, the mobile device 110 utilizes contextual data from local datasets to compile its SCP based on the definitions. The mobile device 110 connects to the access point of the CVD 130 using the SCP. The CVD 130 and the mobile device 110 also connect to the passive device 61 since it is part of the SCP definition.

As used by the assigning authority engine 1105, a predetermined work assignment is a temporal event with a fixed start and completion based on assignable boundary conditions. The assignable boundary condition is at least one of a predetermined time period, a geographical destination, or a set micro-navigation route. Alternatively, the assignable boundary condition is any feature with a beginning and a termination. The assigning authority is performed by a person or persons, who have the appropriate authority and mechanisms to assign specific tasks and assets to a specific vehicle and vehicle operator or custodian, and to assign workflow assignments to same. The predetermined work assignment is assigned to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a pairing event.

The CVD 130 preferably broadcasts a WiFi wireless network with a hidden and hashed SSID unique to the host vehicle and protected by a unique, dynamically generated and hashed passphrase. The vehicle ID is entered into an application on the tablet that is then converted to the same hashed SSID and passphrase, which allows the tablet to attempt to connect to the corresponding CVD WiFi network and begin communication.

Figure 7:
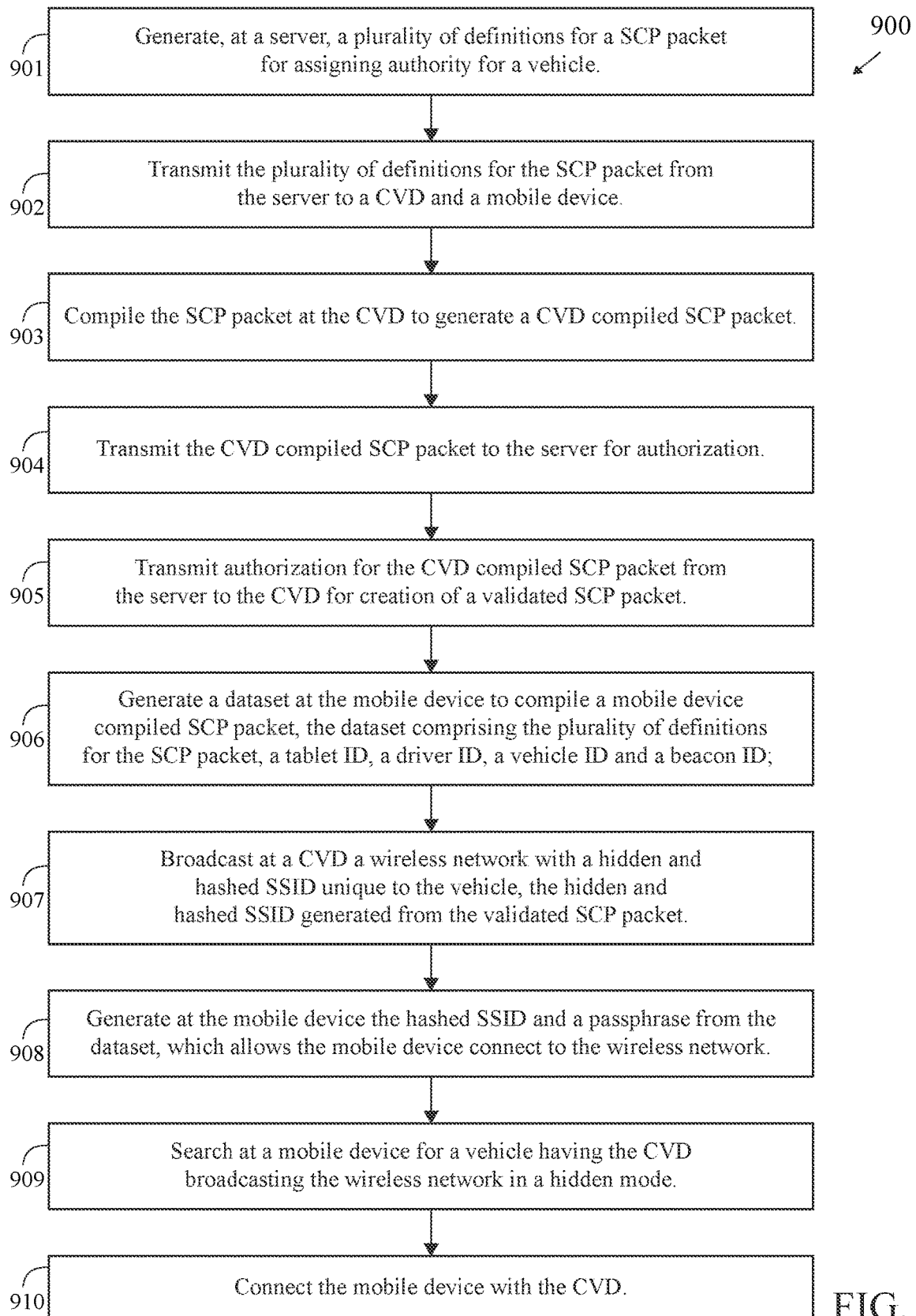
FIG. 7 is a flow chart of a method for a secure connection to a wireless network of a vehicle.

A method 900 for a secure connection to a wireless network of a vehicle is shown in FIG. 7. At block 901, a server generates definitions for a SCP packet for assigning authority for a vehicle. At block 902 the server transmits the definitions for the SCP packet to a CVD and a mobile device. At block 903, the CVD compiles the SCP packet to generate a CVD compiled SCP. At block 904, the CVD transmits the CVD compiled SCP to the server for authorization. At block 905, the server transmits authorization for the CVD compiled SCP from to the CVD for creation of a validated SCP. At block 906, the mobile device generates a dataset to compile a mobile device compiled SCP. At block 907, the CVD broadcasts at a wireless network with a hidden and hashed SSID unique to the vehicle. The hidden and hashed SSID is generated from the validated SCP packet. At block 908, the mobile device generates the hashed SSID and a passphrase from the dataset, which allows the mobile device connect to the wireless network. At block 909, the mobile device searches for a vehicle having the CVD broadcasting the wireless network in a hidden mode. At block 910, the mobile device securely connects with the CVD.

One embodiment utilizes a system for vehicle to mobile device secure wireless communications. The system comprises a vehicle 210, a CVD 130, a mobile device 110 and a passive communication device 61. The vehicle 210 comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The mobile device 110 comprises a graphical user interface, a mobile application, a processor, a WiFi radio, and a cellular network interface. The passive communication device 61 operates on a BLUETOOTH communication protocol. The server 11 is configured to generate a plurality of definitions for a SCP packet for assigning authority for the vehicle. The server 11 is configured to transmit the plurality of definitions for the SCP packet from the server to the CVD 130 and the mobile device 110. The CVD 130 is configured to compile the SCP packet to generate a CVD compiled SCP. The CVD 130 is configured to transmit the CVD compiled SCP to the server 11 for authorization. The server 11 is configured to transmit authorization for the CVD compiled SCP to the CVD 130 for creation of a validated SCP. The mobile device 110 is configured to generating a dataset to compile a mobile device compiled SCP. The CVD 130 is configured to broadcast a wireless network with a hidden and hashed SSID unique to the vehicle, the hidden and hashed SSID generated from the validated SCP packet. The mobile device 110 is configured to generate the hashed SSID and a passphrase from the dataset, which allows the mobile device connect to the wireless network. The mobile device 110 is configured to search for a vehicle having the CVD broadcasting the wireless network in a hidden mode. The mobile device 110 is configured to connect to the CVD 130 over the wireless network.

The dataset preferably comprises at least one of a plurality of definitions for the SCP packet, a tablet ID, a driver ID, a vehicle ID, a beacon ID, identified or defined entity/participant to the transaction, descriptions, actions, or states of thing, characteristics of identifiable devices, when present in a certain proximity and/or context.

Optionally, the mobile device 110 connects to a passive device, the passive device operating on a BLUETOOTH communication protocol. The passive device 61 is preferably a BLUETOOTH enabled device advertising a unique ID as a beacon or a complex system (speaker, computer, etc.) that emits BLUETOOTH enabled device advertising a unique ID as a beacon.

The mobile device 110 preferably receives input from a driver of the vehicle, and/or the server 11 contains the assigning authority that generates the SCP definitions.

The passive device 61 is preferably an internal device in the vehicle or an external device posted on a gate to a facility and generating a beacon. The beacon from the passive device is preferably a mechanism to ensure that the connection between the mobile device 110 and the CVD 130 occurs at a specific physical location dictated by the assigning authority through the server 11. Preferably, the automatic connection between the mobile device 110 and the CVD occurs because the assigning authority, through the server, has dictated that it occur.

Figure 8:
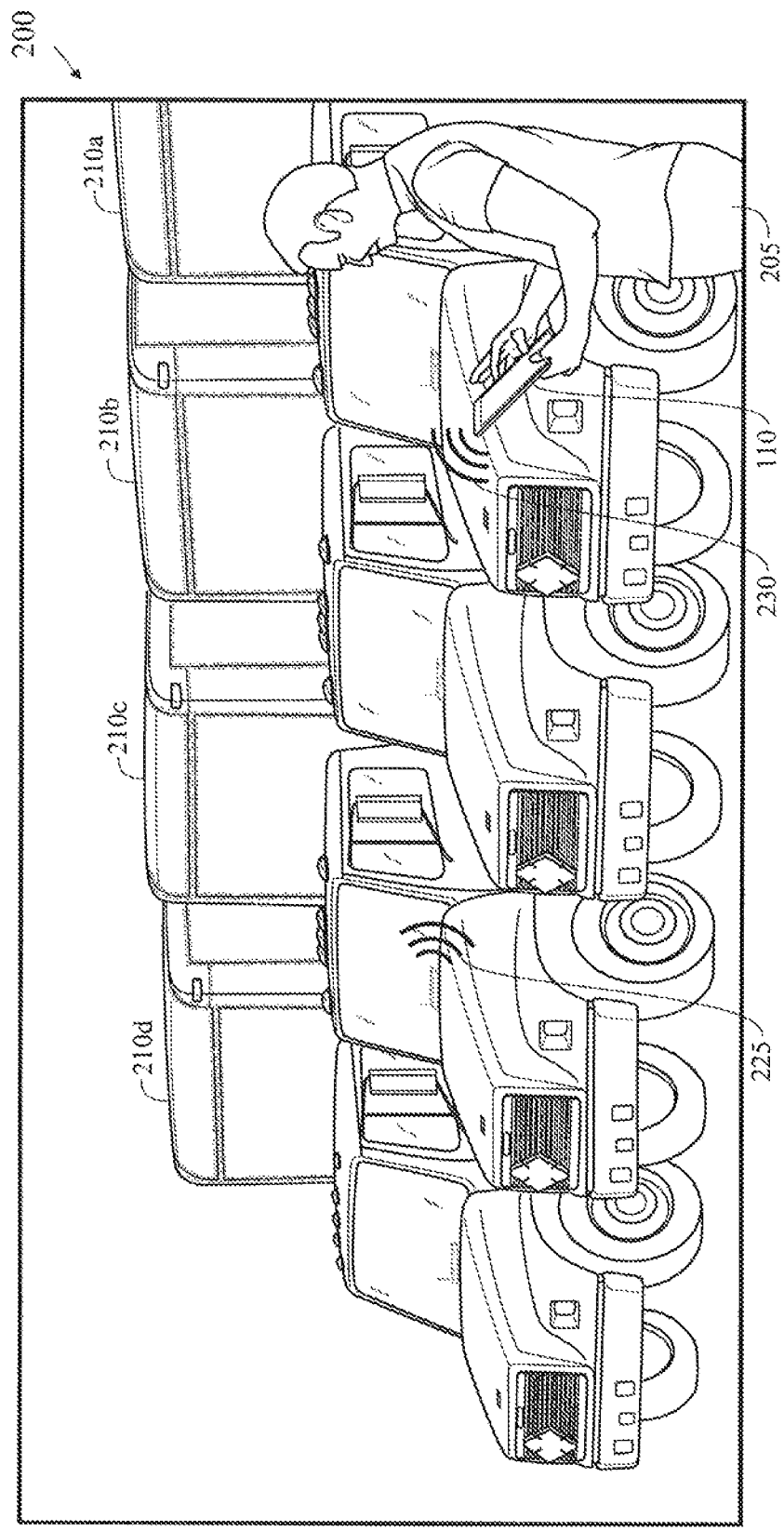
FIG. 8 is an illustration of a driver identifying a vehicle through connection of a tablet computer to an unpublished network.

As shown in FIG. 8, a staging yard for trucks 210a-201d, each of a multitude of trucks 210a-210d broadcast a wireless signal for a truck specific network, with one truck 210c broadcasting a wireless signal 225. However, the SSID is not published so unless a driver is already in possession of the SSID, the driver will not be able to pair the tablet computer 110 with the CVD 130 of the truck 210 to which the driver is assigned. So even though the wireless signals are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include but are not limited to 802.11a, 802.11b, 802.11g, 802.11n, 802.11ac, 802.11ax, AX.25, 3G, 4G, 5G, CBRS (Citizens Broadband Radio Service), CDPD, CDMA, GSM, GPRS, radio, microwave, laser, Bluetooth, 802.15, 802.16, NFC (near field communications), RFID, ZIGBEE, Zwave, LoRa and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology or BLUETOOTH LE technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device 30 and/or the primary device 25 is capable of receiving and transmitting signals using one or more of the 802.11 communication formats. Near-field communications (NFC) may also be utilized.

Figure 9:
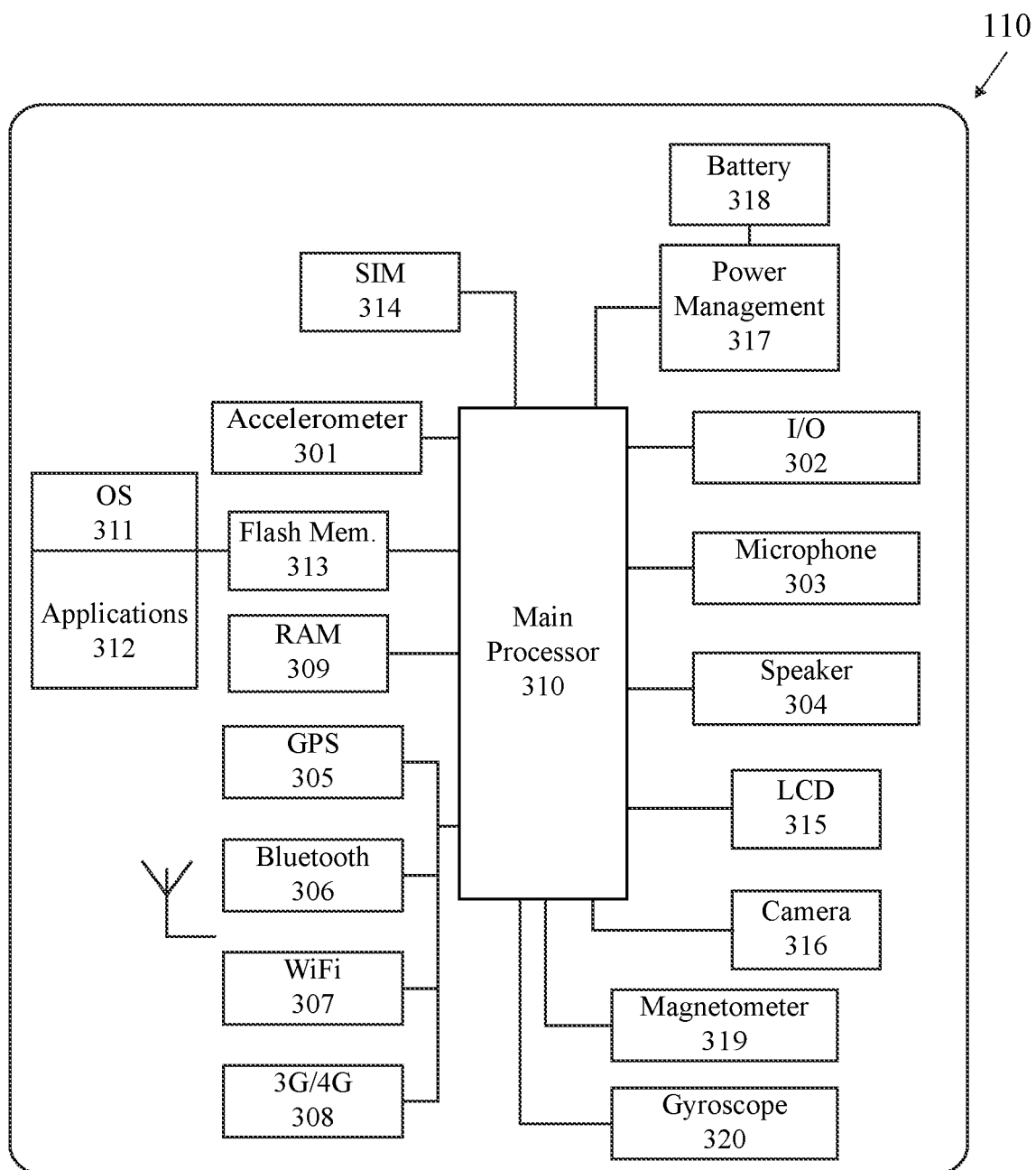
FIG. 9 is an isolated view of general electrical components of a mobile communication device.

As shown in FIG. 9, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at the cloud server is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards preferably include 802.11a, 802.11b, 802.11g, AX.25, 3G, CDPD, CDMA, GSM, GPRS, radio, microwave, laser, Bluetooth, 802.15, 802.16, and IrDA.

Figure 10:
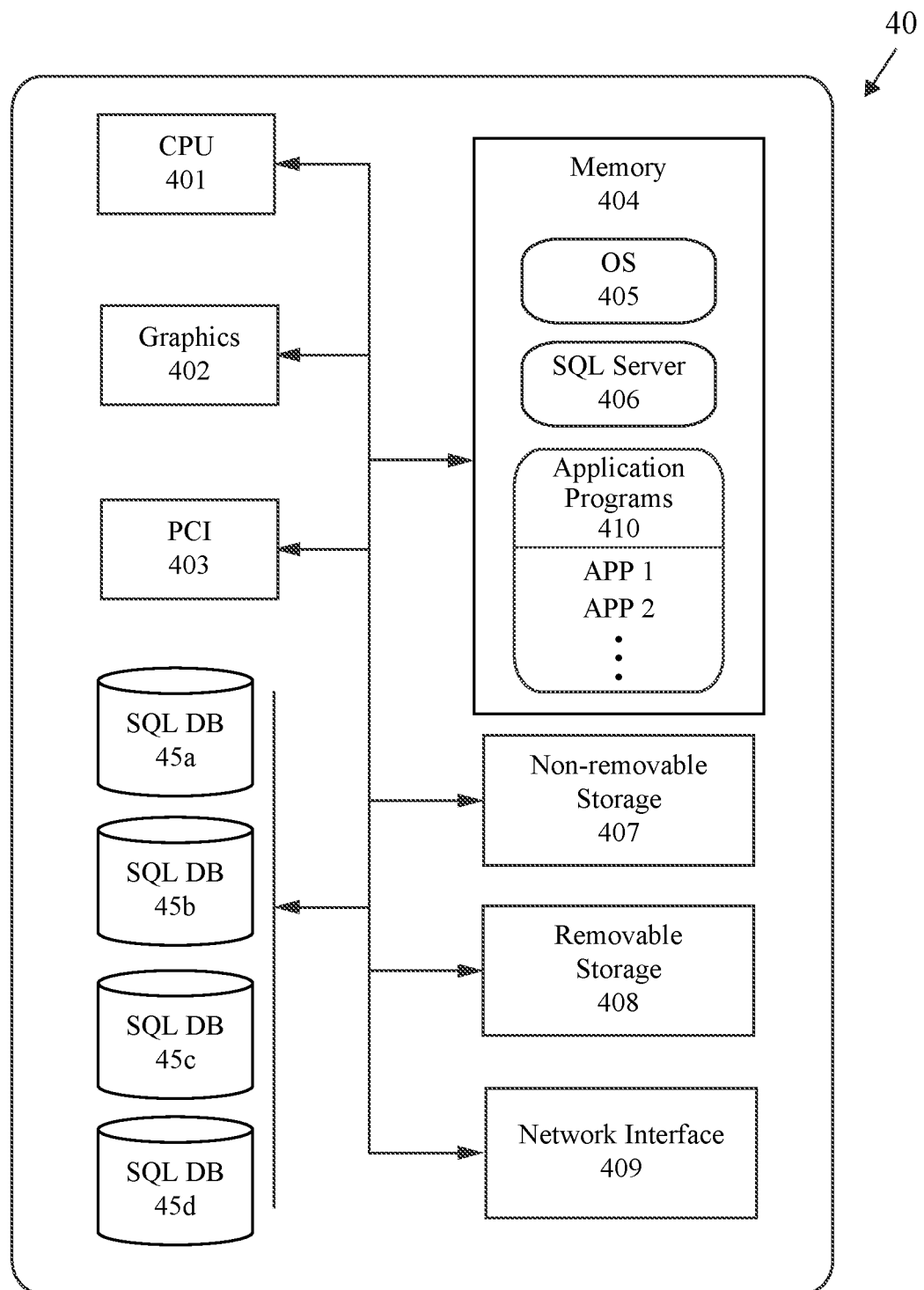
FIG. 10 is an isolated view of general electrical components of a server.

Components of a cloud computing server 40 of the micro-navigation system, as shown in FIG. 10, preferably includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The server 40 also preferably includes at least one computer program configured to receive data uploads and store the data uploads in the SQL database. Alternatively, the SQL server can be installed in a separate server from the server 40.

Figure 11:
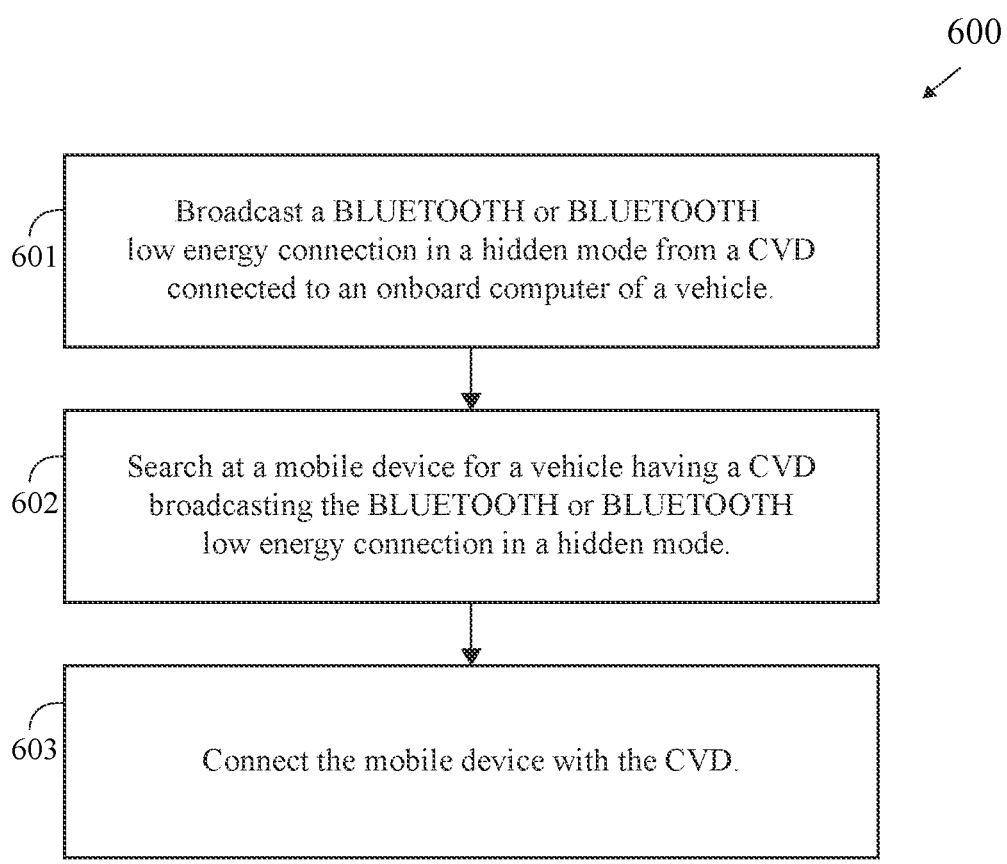
FIG. 11 is a flow chart of method for securely connecting a wireless device to a single access point in a vehicle.

A flow chart for an alternative method 600 for a secure connection to a wireless network of a vehicle is shown in FIG. 11. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is connected with the CVD.

Figure 12:
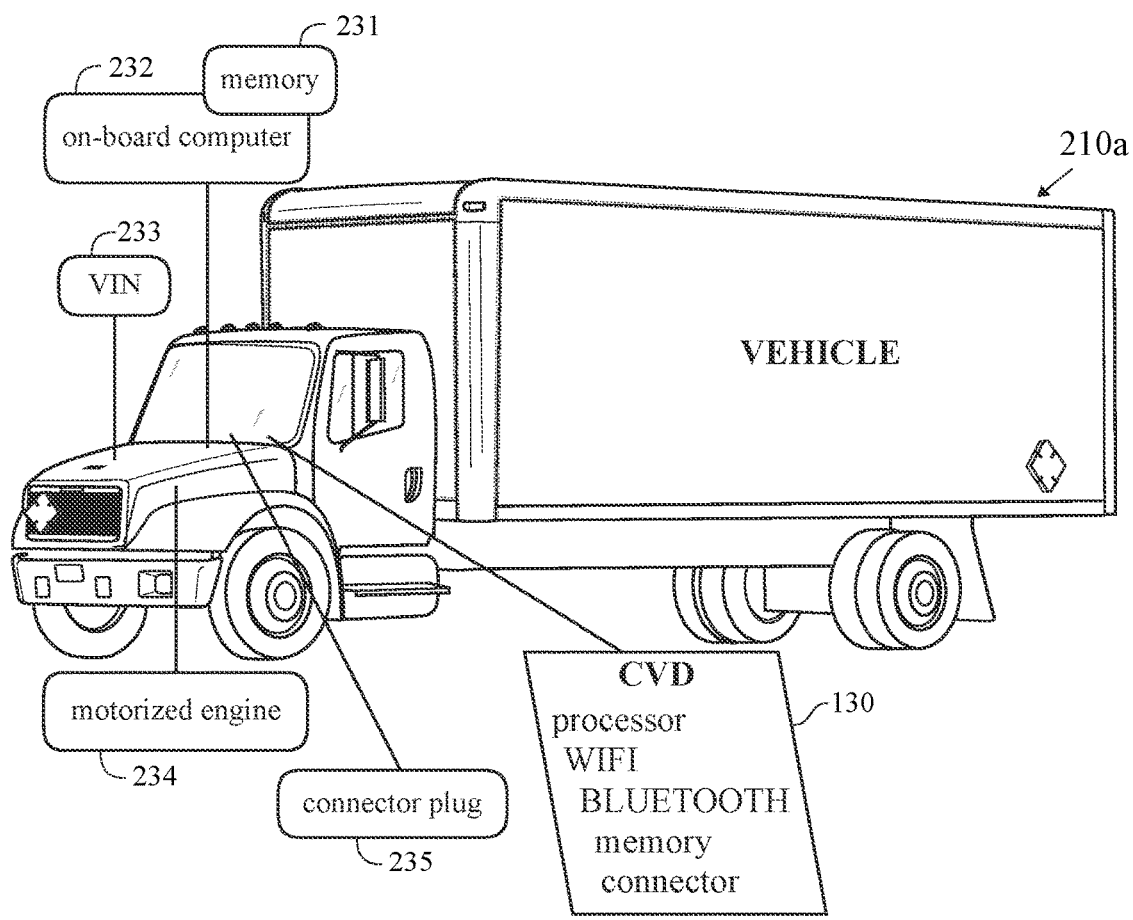
FIG. 12 is an illustration of a system for securely connecting a wireless device to a single access point in a vehicle.
Figure 12:
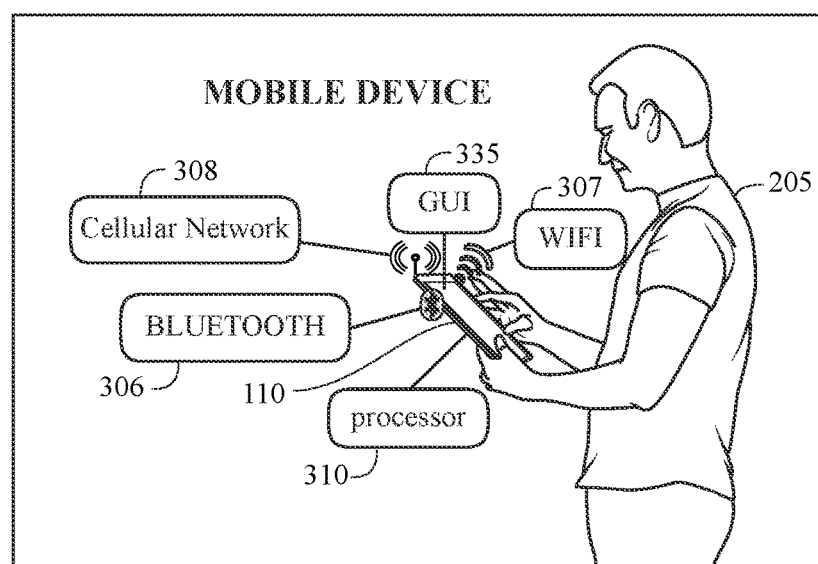

A system for a secure connection to a wireless network of a vehicle is shown in FIG. 12. A truck 210a. Those skilled in the pertinent art will recognize that the truck 210a may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 210a preferably comprises a motorized engine 234, a vehicle identification number ("VIN"), an on-board computer 232 with a memory 231 and a connector plug 235. The on-board computer 232 preferably has a digital copy of the VIN in the memory 231. The on-board computer 232 is preferably in communication with the motorized engine 234. The truck 210a may also have a GPS component for location and navigation purposes, a satellite radio such as SIRIUS satellite radio, a driver graphical interface display, a battery, a source of fuel and other components found in a conventional long distance truck.

Also in the truck 210a is a CVD 130 comprising a processor, a WiFi radio, a BLUETOOTH radio, a memory and a connector to connect to the connector plug of the on-board computer 232.

A driver 205 preferably has a mobile communication device such as a tablet computer 110 in order to pair with a wireless network generated by the CVD 130 of the truck 210a. The tablet computer 110 preferably comprises a graphical user interface 335, a processor 310, a WiFi radio 307, a BLUETOOTH radio 306, and a cellular network interface 308.

Figure 13:
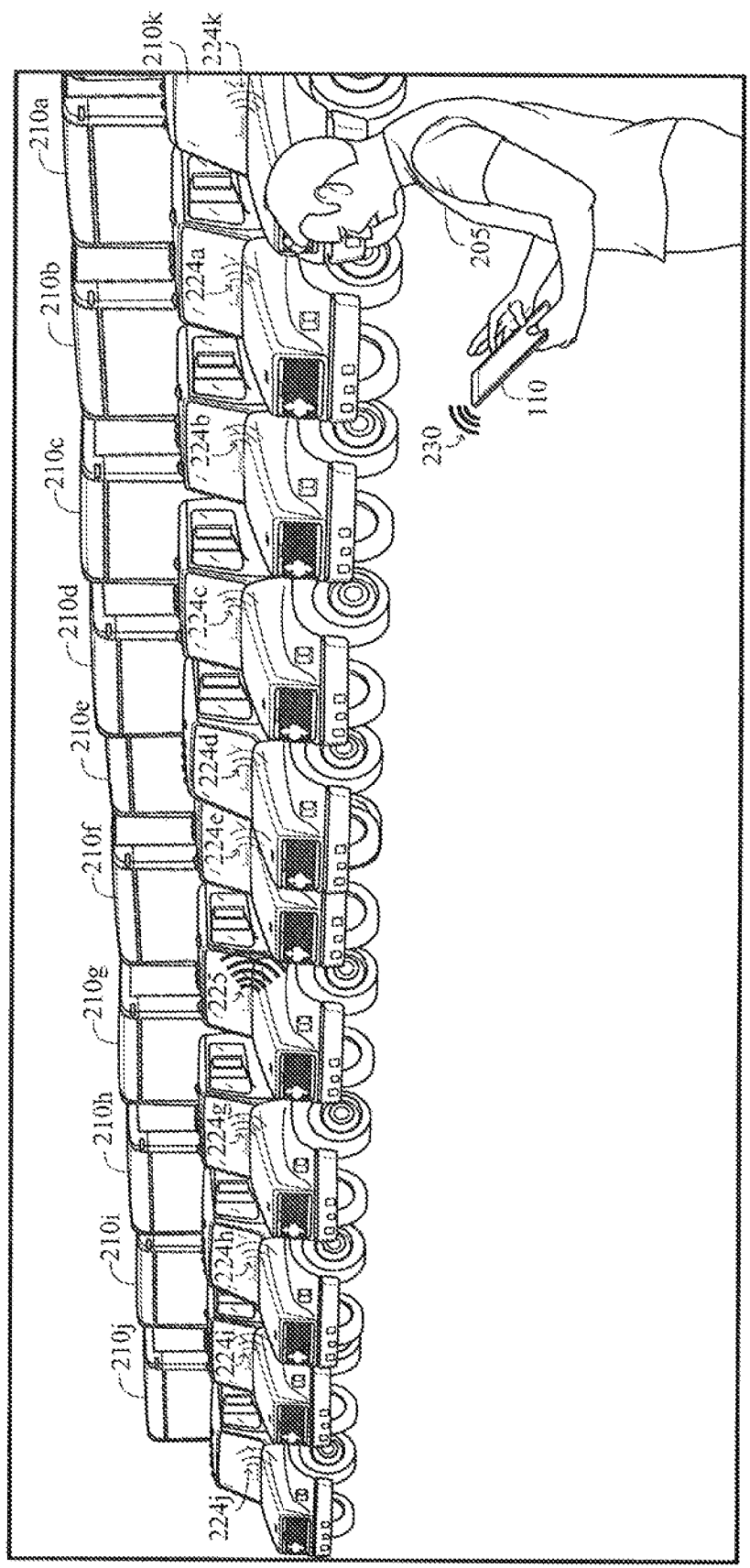
FIG. 13 is an illustration of a driver identifying a vehicle through connection of a tablet computer to an unpublished network.

As shown in FIG. 13, a staging yard for trucks 210a-210k, each of a multitude of trucks 210a-210k broadcast a wireless signal 224a-k for a truck specific network, with one truck 210f broadcasting a wireless signal 225. However, all of the wireless signal 224a-224k and 225 do not publish their respective SSID so that a mobile device 110 must already be paired with the CVD 130 of the truck 210 in order to connect to the truck based wireless network 224a-224k or 225 of each of the CVDs 130 of each of the trucks 210a-210k. A driver 205 in possession of a tablet computer 110 pairs with the specific truck wireless network 225 of the CVD 130 of the truck 210f, and thus the driver locates the specific truck 210f the driver is assigned to in a parking lot full of identical looking trucks 210a-210k.

One embodiment is a system for micro-navigation. The system preferably comprises a truck 210, a CVD 130, a tablet computer (mobile device) 110, a server 40 and a plurality of databases. The vehicle preferably comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. A location of the truck 210 is preferably determined using a GPS component of the truck 210. The location of the truck 210 is transmitted to the server 140 by the CVD. The server 40 retrieves a micro-navigation guidance protocol for the location of the truck from the plurality of databases. The server 40 transmits the micro-navigation guidance protocol to the CVD 130 for display on the tablet computer 110. The micro-navigation guidance protocol is activated on the tablet computer 110 for example upon arrival at the entrance of a destination site. The truck 210 is guided using the micro-navigation guidance protocol from the entrance to a terminal location within the destination site. The server can also provide real-time compliance rules that pertain to speed limits, transport of toxic waste, the transport of refrigerated cargo, the rest durations for drivers, the necessary insurance coverage, the type of taxes and fees to be paid, and the like. The display on the tablet computer is preferably in the form of a visual alert, an audio alert or a haptic alert. Other displays include forms such as attestation forms, and data such as timers, current speed limits, and the like. A trigger is preferably from the GPS of the truck 210, the speed of the truck 210, cellular or WiFi triangulation from a network, and the like.

The CVD 130 obtains the vehicle identification number (VIN) from the on-board computer and transmits the VIN with the location to the server 140 for verification of the truck 210.

Another embodiment is a micro-navigation system that utilizes a remote profile manager for utilizing multiple vehicle odometer values. The system comprises a vehicle 210, a CVD 130, a tablet computer 110, a server 40 and a plurality of databases. The vehicle comprises an on-board computer with a memory having a vehicle identification number (VIN), a connector plug, a motorized engine, an odometer component from an engine source, an odometer component from a dashboard source, an odometer component from a chassis source, and an odometer component from a transmission source. Thus, the truck 210 has a multiple of odometers that can be used to determine a mileage of the truck 210. The connected vehicle device (CVD) 130 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. Each of the odometer component from an engine source, the odometer component from a dashboard source, the odometer component from a chassis source, and the odometer component from a transmission source generates an odometer value. The CVD 130 generates a delta value for odometer value relative to a control odometer value. The CVD 130 monitors the odometer value from each of the odometer component from an engine source, the odometer component from a dashboard source, the odometer component from a chassis source, and the odometer component from a transmission source. The CVD 130 generates a new odometer value for one of the odometer component from an engine source, the odometer component from a dashboard source, the odometer component from a chassis source, and the odometer component from a transmission source, and the CVD modifies the odometer value by the delta value to generate the new odometer value. The new odometer value can be used with the micro-navigation.

Figure 14:
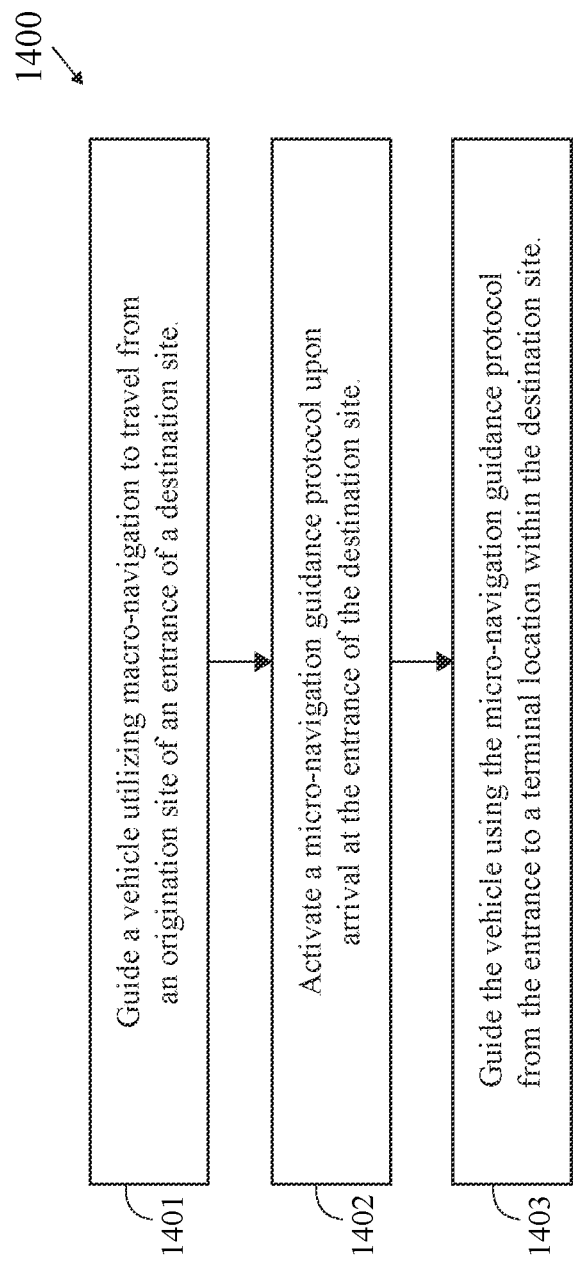
FIG. 14 is a flow chart for a method for micro-navigation of a vehicle.

As shown in FIG. 14, a method for micro-navigation of a vehicle is generally designated 1400. At block 1401, a vehicle is guided utilizing macro-navigation to travel from an origination site of an entrance of a destination site. Guidance is preferably provided from a server over a communications network to a CVD within the vehicle, and then to a mobile device of the operator of the vehicle. At block 1402, a micro-navigation guidance protocol is activated upon arrival at the entrance of the destination site. At block 1403, the vehicle is guided using the micro-navigation guidance protocol (preferably on the mobile device with follow-up instructions from the server if needed) from the entrance to a terminal location within the destination site.

Figure 15:
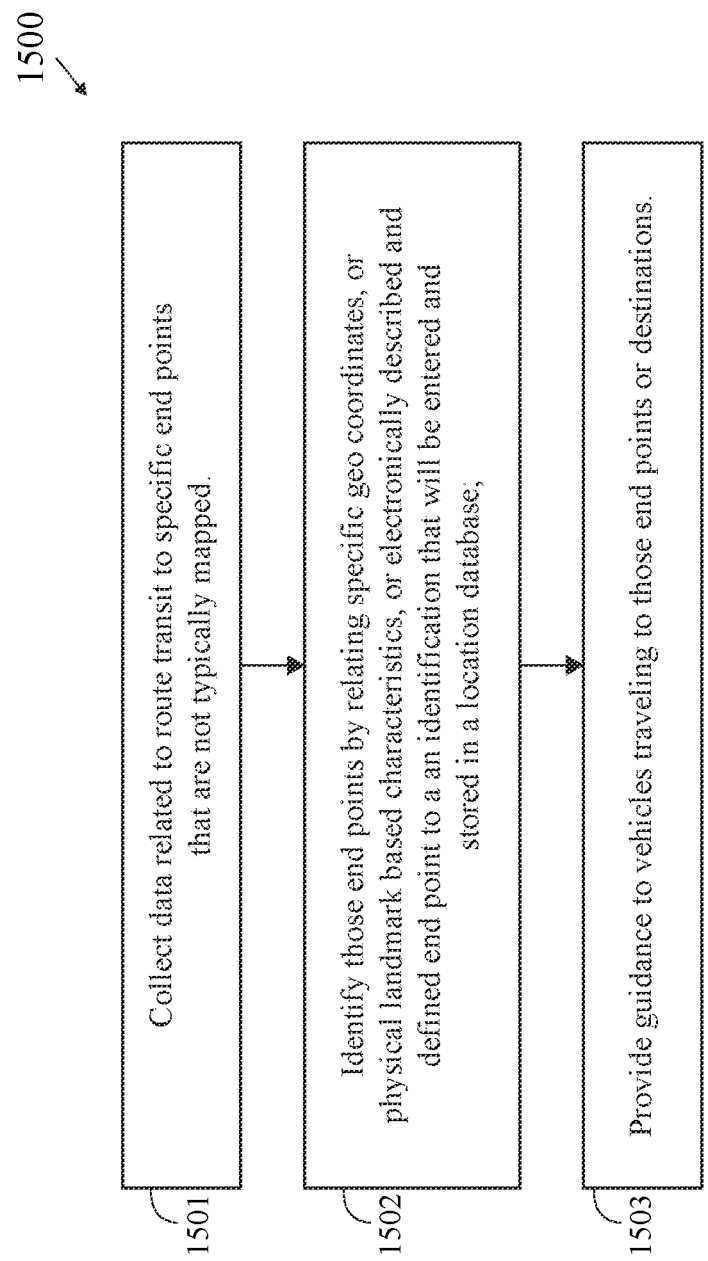
FIG. 15 is a flow chart for a method for micro-navigation of a vehicle.

As shown in FIG. 15, a method for a micro-navigation of a vehicle is generally designated 1500. At block 1501, a server collects data related to route transit to specific end points that are not typically mapped. At block 1502, those end points are identified, by the server, by relating specific geo coordinates, or physical landmark based characteristics, or electronically described and defined end point to a an identification that will be entered and stored in a location database. At block 1503, guidance is provided by the server to vehicles traveling to those end points or destinations, with additional information relevant to a route and/or a specific vehicle and configuration updated and made available to the system.

Figure 16:
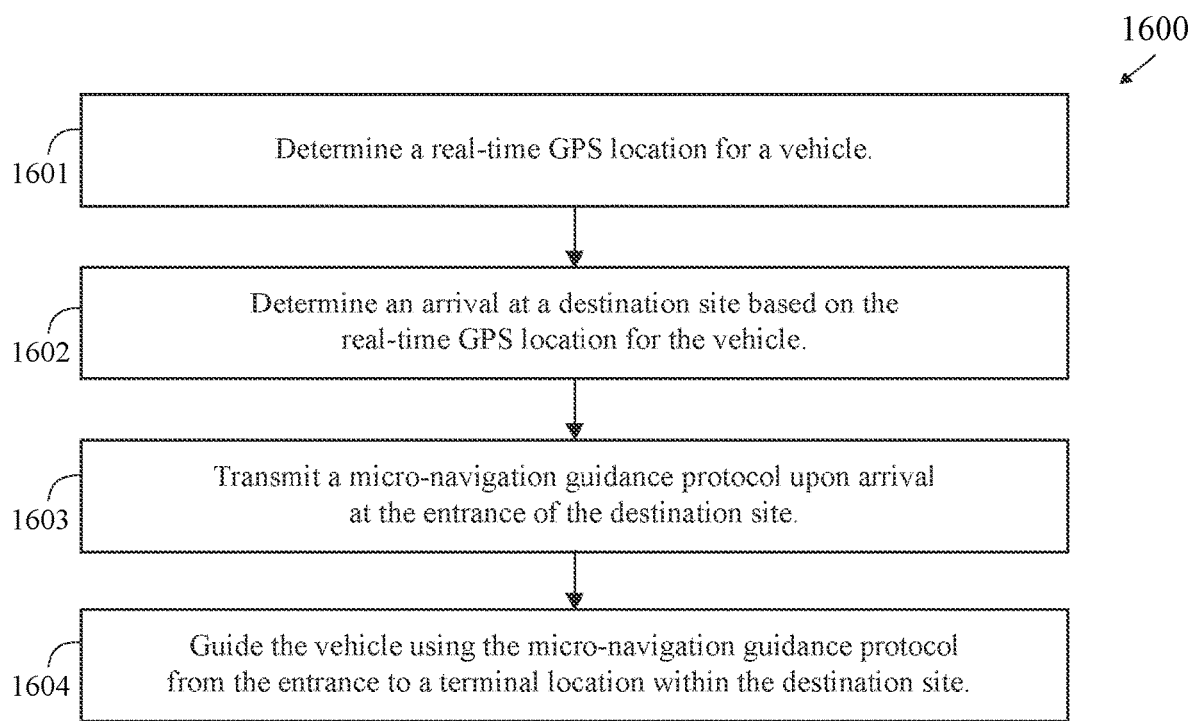
FIG. 16 is a flow chart for a method for micro-navigation of a vehicle.

As shown in FIG. 16, a method for a micro-navigation of a vehicle is generally designated 1600. At block 1601, a real-time GPS location for a vehicle is determined by the vehicle or a mobile device located on the vehicle. At block 1602, an arrival at a destination site based on the real-time GPS location for the vehicle is determined by a server. At block 1603, a micro-navigation guidance protocol upon arrival at the entrance of the destination site is transmitted from the server to a CVD of the vehicle, and then preferably to a mobile device of the operator of the vehicle. At block 1604, the vehicle is guided using the micro-navigation guidance protocol (preferably on the mobile device) from the entrance to a terminal location within the destination site.

Figure 17:
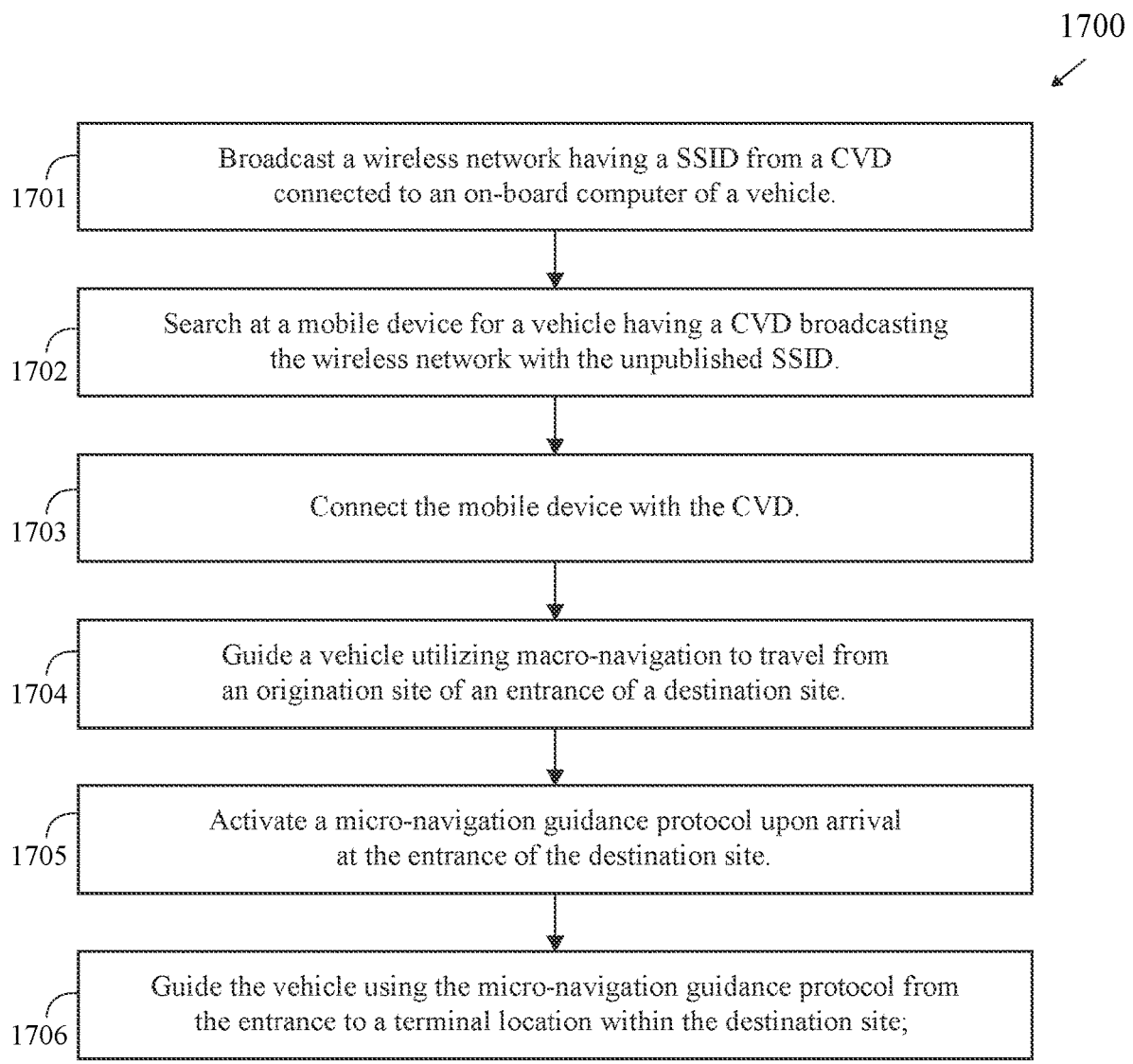
FIG. 17 is a flow chart for a method for micro-navigation of a vehicle.

As shown in FIG. 17, a method for a micro-navigation at a facility is generally designated 1700. At block 1701, a wireless network having a SSID is broadcast from a CVD connected to an on-board computer of a vehicle, wherein the SSID of the wireless network is not published. At 1702, a mobile device searches for a vehicle having a CVD broadcasting the wireless network with the unpublished SSID. At block 1703, the mobile device connects with the CVD. At block 1704, a vehicle is guided utilizing macro-navigation (preferably on the mobile device) to travel from an origination site of an entrance of a destination site. At block 1705, a micro-navigation guidance protocol on the mobile device is activated upon arrival at the entrance of the destination site. At block 1706, the vehicle is guided using the micro-navigation guidance protocol on the mobile device from the entrance to a terminal location within the destination site.

An operating system preferably controls the execution of other computer programs, running of the PSO platform, and provides scheduling, input-output control, file and data management, memory management, and communication control and related services. The operating system may be, for example Windows (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), Apple OS X, iOs and variants thereof (available from Apple, Inc. of Cupertino, Calif.), or the like.

The system and method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

Kennedy et al., U.S. Pat. No. 11,197,329 for a Method And System For Generating Fueling Instructions For A Vehicle, is hereby incorporated by reference in its entirety.

Kennedy et al., U.S. Pat. No. 11,197,330 for a Remote Profile Manager For A Vehicle, is hereby incorporated by reference in its entirety.

Kennedy et al., U.S. Pat. No. 10,652,935 for Secure Wireless Networks For Vehicles, is hereby incorporated by reference in its entirety.

Kennedy et al., U.S. Pat. No. 11,330,644 for Secure Wireless Networks For Vehicle Assigning Authority, is hereby incorporated by reference in its entirety.

Kennedy et al., U.S. Pat. No. 10,917,921 for Secure Wireless Networks For Vehicles, is hereby incorporated by reference in its entirety.

Son et al., U.S. Pat. No. 10,475,258 for a Method And System For Utilizing Vehicle Odometer Values And Dynamic Compliance, is hereby incorporated by reference in its entirety.

Son et al., U.S. Pat. No. 10,070,471 for a Secure Wireless Networks For Vehicles, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for micro-navigation of a mobile object, the method comprising:
   receiving at a mobile computing device guidance for the mobile object to utilize macro-navigation to travel from an origination site to a macro/micro route interface site, the guidance based on a workflow comprising an origination location of the mobile object, a destination site of the mobile object, and a route to the destination;
   guiding the mobile object utilizing macro-navigation to travel from the origination site to the macro/micro route interface site;
   determining that the mobile object has arrived at the destination site based on GPS data received at the mobile computing device;
   initiating a micro-navigation guidance protocol upon approach to the macro/micro route interface site; and
   guiding the mobile object using the micro-navigation guidance protocol from the macro/micro route interface site to a terminal location within the destination site.

2. The method according to claim 1 further comprising:
   determining a size of the mobile object; and
   determining a route within the destination site from the macro/micro route interface site to a terminal location based on the size of the mobile object.

3. The method according to claim 1 further comprising receiving at the mobile computing device a real-time micro-navigation guidance protocol based on a plurality of input parameters related to the destination site.

4. The method according to claim 1 further comprising:
   transmitting from mobile computing device to a server real-time data for the mobile object generated on board diagnostics for the mobile object; and
   transmitting from mobile computing device to the server a configuration of the mobile object.

5. The method according to claim 4 wherein the real-time data for the mobile object comprises a real-time speed of the mobile object, tire pressure values from a plurality of tire sensors, refrigeration/HVAC unit values, a plurality of fluid levels, a plurality of power unit values, a real-time fuel tank capacity, and a fuel type.

6. The method according to claim 4 wherein the configuration of the mobile object is selected from one of a single trailer vehicle, a dual trailer vehicle, a triple trailer vehicle, and a refrigeration trailer vehicle.

7. A system for micro-navigation of a mobile object, the system comprising:
   a mobile object;
   a mobile computing device with an active connection to a data bus of the mobile object;
   wherein the mobile computing device is configured to receive guidance for guiding the mobile object utilizing macro-navigation to travel from the origination site to a macro/micro route interface site based on a workflow for the mobile object, the workflow comprising an origination location of the mobile object, a destination site of the mobile object, and a route to the destination;
   wherein the mobile computing device is configured to initiate a micro-navigation guidance protocol upon approach to the macro/micro route interface site; and
   wherein the mobile computing device is configured to provide guidance for guiding the mobile object using the micro-navigation guidance protocol from the macro/micro route interface site to a terminal location within the destination site.

8. The system according to claim 7 wherein the micro-navigation guidance protocol is based on a plurality of input parameters related to the destination site.

9. The system according to claim 7 wherein the mobile computing device is configured to determine a real-time GPS location of the mobile object.

\* \* \* \* \*